(12) United States Patent
Baseeth et al.

(10) Patent No.: US 9,963,368 B2
(45) Date of Patent: May 8, 2018

(54) MICROEMULSIONS AND USES THEREOF IN DISPERSING CATALYSTS

(75) Inventors: Shireen Baseeth, Decatur, IL (US); Bruce Sebree, Oakley, IL (US); Donovan Smith, Parkville, KS (US); Gwyn Isenhouer, Lawrence, KS (US)

(73) Assignees: Archer Daniels Midland Company, Decatur, IL (US); JRW Bioremediation, Lenexa, KS (US)

( * ) Notice: Subject to any disclaimer, the term of this patent is extended or adjusted under 35 U.S.C. 154(b) by 808 days.

(21) Appl. No.: 13/885,459

(22) PCT Filed: Nov. 15, 2011

(86) PCT No.: PCT/US2011/060785
§ 371 (c)(1),
(2), (4) Date: Jun. 17, 2013

(87) PCT Pub. No.: WO2012/068105
PCT Pub. Date: May 24, 2012

(65) Prior Publication Data
US 2013/0256590 A1   Oct. 3, 2013

Related U.S. Application Data

(60) Provisional application No. 61/413,761, filed on Nov. 15, 2010.

(51) Int. Cl.
*B01J 13/00* (2006.01)
*C02F 1/70* (2006.01)
(Continued)

(52) U.S. Cl.
CPC ............ *C02F 1/70* (2013.01); *B09C 1/002* (2013.01); *B09C 1/08* (2013.01); *C02F 1/705* (2013.01);
(Continued)

(58) Field of Classification Search
CPC .... C02F 1/70; C02F 3/34; C02F 1/705; C02F 1/444; C02F 3/348; C02F 3/28;
(Continued)

(56) References Cited

U.S. PATENT DOCUMENTS 3,833,743 A * 9/1974 Morse et al. ............ A21D 2/08
426/311
3,859,311 A 1/1975 Symon et al.
(Continued)

FOREIGN PATENT DOCUMENTS

EP   0098561 A2   1/1984
EP   0099039 A1   1/1984
(Continued)

OTHER PUBLICATIONS

Martino, Anthony, Jess P. Wilcoxon, and Jeffrey S. Kawola. "Synthesis and characterization of coal liquefaction catalysts in inverse micelles." Energy & fuels 8.6 (1994): 1289-1295.*
(Continued)

*Primary Examiner* — Daniel S Metzmaier
(74) *Attorney, Agent, or Firm* — Andrew F. Nilles

(57) ABSTRACT

Compositions for converting contaminants or dispersing compounds are described. Systems and methods of using the compositions are also disclosed.

14 Claims, 9 Drawing Sheets

(51) Int. Cl.
*B09C 1/00* (2006.01)
*B09C 1/08* (2006.01)
*C02F 3/34* (2006.01)
*C02F 1/44* (2006.01)
*C02F 101/36* (2006.01)
*C02F 103/06* (2006.01)
*C02F 3/28* (2006.01)

(52) U.S. Cl.
CPC .............. *C02F 3/348* (2013.01); *C02F 1/444* (2013.01); *C02F 3/28* (2013.01); *C02F 2101/36* (2013.01); *C02F 2103/06* (2013.01); *C02F 2209/06* (2013.01); *C02F 2305/04* (2013.01); *C02F 2305/08* (2013.01); *Y02E 50/343* (2013.01); *Y02W 10/45* (2015.05)

(58) Field of Classification Search
CPC .............. C02F 2305/04; C02F 2209/06; C02F 2101/36; C02F 2103/06; C02F 2305/08; B09C 1/002; B09C 1/08; Y02W 10/45; Y02E 50/343
USPC ........................................................ 516/53
See application file for complete search history.

(56) References Cited

U.S. PATENT DOCUMENTS

| | | | |
|---|---|---|---|
| 4,243,831 A | 1/1981 | Malley et al. | |
| 4,442,092 A | 10/1984 | McBrayer | |
| 5,030,463 A | 7/1991 | Evans et al. | |
| 5,034,140 A * | 7/1991 | Gardner | C09K 8/74 166/307 |
| 5,045,337 A * | 9/1991 | El-Nokaly | A23D 7/0053 426/601 |
| 5,260,260 A | 11/1993 | Gednalske et al. | |
| 5,283,217 A * | 2/1994 | Ikura | B01J 37/18 502/150 |
| 5,389,681 A | 2/1995 | Galli et al. | |
| 5,482,529 A | 1/1996 | Ahlnas et al. | |
| 5,770,172 A * | 6/1998 | Linehan | B01J 35/0013 208/420 |
| 5,891,490 A * | 4/1999 | Merabet | A23D 7/0053 426/241 |
| 6,001,252 A | 12/1999 | Rice et al. | |
| 6,251,411 B1 * | 6/2001 | Kishida | A61K 8/11 424/401 |
| 6,280,533 B1 | 8/2001 | Hoppe et al. | |
| 6,348,434 B1 | 2/2002 | Schmidt et al. | |
| 6,367,560 B1 | 4/2002 | de Ris et al. | |
| 6,416,766 B1 * | 7/2002 | Kobayashi | A61K 8/11 424/401 |
| 6,534,549 B1 | 3/2003 | Newton et al. | |
| 6,555,121 B1 | 4/2003 | Bessette et al. | |
| 6,566,308 B1 | 5/2003 | Aven et al. | |
| 6,599,539 B1 | 7/2003 | Taylor | |
| 6,639,098 B2 | 10/2003 | Farone et al. | |
| 6,797,673 B1 | 9/2004 | Worthley et al. | |
| 6,806,078 B2 | 10/2004 | Newman et al. | |
| 7,019,036 B2 | 3/2006 | Hiromoto et al. | |
| 7,045,339 B2 | 5/2006 | Sorenson, Jr. et al. | |
| 7,138,059 B2 | 11/2006 | Sorenson, Jr. et al. | |
| 7,179,381 B2 | 2/2007 | Sorenson, Jr. et al. | |
| 7,231,976 B2 | 6/2007 | Berry et al. | |
| RE40,448 E | 8/2008 | Borden et al. | |
| 7,785,468 B2 | 7/2010 | Baseeth et al. | |
| 8,080,266 B2 | 12/2011 | Baseeth et al. | |
| 8,282,950 B2 | 10/2012 | Bohus et al. | |
| 8,283,034 B2 | 10/2012 | Feitz et al. | |
| 8,377,329 B2 * | 2/2013 | Baseeth | B09B 3/00 252/180 |
| 2002/0160916 A1 | 10/2002 | Volgas et al. | |
| 2003/0198696 A1 | 10/2003 | Keen et al. | |
| 2005/0037115 A1 | 2/2005 | Fullmer et al. | |
| 2005/0129639 A1 * | 6/2005 | Quemin | A61K 8/044 424/63 |
| 2005/0175644 A1 | 8/2005 | Vachy et al. | |
| 2005/0232953 A1 * | 10/2005 | Barnikol | A61K 8/064 424/400 |
| 2005/0244445 A1 | 11/2005 | Anderson et al. | |
| 2006/0180677 A1 | 8/2006 | McManic et al. | |
| 2007/0078057 A1 | 4/2007 | Rowley et al. | |
| 2007/0131010 A1 | 6/2007 | Binder et al. | |
| 2008/0175930 A1 | 7/2008 | Baseeth et al. | |
| 2008/0190865 A1 | 8/2008 | Zhao et al. | |
| 2008/0194410 A1 | 8/2008 | Baseeth et al. | |
| 2008/0272051 A1 * | 11/2008 | Baseeth | B09B 3/00 210/631 |
| 2010/0227381 A1 * | 9/2010 | Hoag | B09C 1/00 435/262.5 |
| 2015/0151264 A1 * | 6/2015 | Baseeth | A61K 8/068 424/401 |

FOREIGN PATENT DOCUMENTS

| | | |
|---|---|---|
| EP | 0139374 A1 | 5/1985 |
| EP | 0577914 A1 | 1/1994 |
| EP | 1422001 A1 | 5/2004 |
| JP | 1996-12621 A | 1/1996 |
| WO | 8908628 A1 | 9/1989 |
| WO | 9848624 A1 | 11/1998 |
| WO | 9962337 A2 | 12/1999 |
| WO | 0126463 A1 | 4/2001 |
| WO | 03106599 A1 | 12/2003 |
| WO | 2007008557 A1 | 1/2007 |
| WO | 2007030649 A2 | 3/2007 |
| WO | 2008085232 A2 | 7/2008 |
| WO | 2008122728 A2 | 10/2008 |
| WO | WO 2009/014697 A2 * | 1/2009 |
| WO | 2010018596 A2 | 2/2010 |

OTHER PUBLICATIONS

Hawley's Condensed Chemical Dictionary, (2007), John Wiley & Sons, Inc. Online @ http://onlinelibrary.wiley.com/book/10.1002/9780470114735/titles, headwords = Cysteine, Silver Nitrate, downloaded Aug. 11, 2016), pp. 1-2.*
The Merck Index—Online, Monograph ID: M9927, The Merck Index, Merck Sharp & Dohme Corp., subsidiary of Merck & Co., Inc., Whitehouse Station, N.J., U.S.A., Online @ https://www.rsc.org/Merck-Index/monograph/print/m9927/silver%20nitrate?q=authorize, pp. 1-2.*
Lee et al., "A comparison of coprecipitation with microemulsion methods in the preparation of magnetite", J. Applied Physics, vol. 85, No. 8, pp. 5231-5233, (Apr. 15, 1999), American Institute of Physics.*
Zhang et al., "Synthesis of nanoiron by microemulsion with Span/Tween as mixed surfactants for reduction of nitrate in water", Front. Environ. Sci. Engin. China (2007), 1(4): 466-470.*
Written Opinion of the International Searching Authority and International Search Report for International Application No. PCT/US2008/051663. European Patent Office (acting as International Searching Authority), 13pgs, dated Feb. 25, 2009).
Thomas Muller et al, Ethoxylated rapeseed oil derivatives as novel adjuvants for herbicides, Pest Management Science, vol. 58, 2002, pp. 1243-1249, cited in the application abstract.
Martin Guerena, Nematodes: Alternative Controls, ATTRA, www.attra.ncat.org, pp. 1-24, 2006, USA.
Mike McCullough, California Fairways: Nematode Research Results, California Fairways, Jan.-Feb. 2005, pp. 1-2, Adams Business Media, USA.
W.T. Crow, Biologically Derived Alternatives to Nemacur, Environmental Institute for Golf, pp. 147-150, Jan. 2005, USA.
W.T.Crow, Alternatives to Fenamiphos for Management of Plant-Parasitic Nematodes on Bermudagrass, Journal of Nematology, pp. 477-0482, 2005 USA.
Written Opinion of the International Searching Authority and International Search Report for International Application No. PCT/

(56) References Cited

OTHER PUBLICATIONS

US2008/053667. European Patent Office (acting as International Searching Authority), 15 pgs. 2008.
P.J. Holloway et al, Effects of some agricultural tank-mix adjuvants on the deposition efficiency of aquoeus sprays on foliage, Crop Protection, vol. 19, No. 1, 2000, pp. 27-37, XP002513889.
Barnes, Daniel, and Warner, Biodegradation of a Mixture of Chlorinated Volatile Organic Compounds, Department of Chemistry and Geochemistry, Colorado School of Mines, Jan. 13, 2006, pp. 1-10, Golden Colorado, USA.
Deweerd, Flanagan, Brennan, Principe, Spivack, Biodegradation of Trichloroethylene and Dichloromethane in Contaminated Soin and Groundwater, General Electric Corporate Research and Development, 1998, pp. 29-42, New York, USA.
Aldrett, Bonner, Mills, Autenrieth, and Stephens, Microbial Degradation of Crude Oil in Marine Environments Tested in a Flask Experiment, Texas A&M University, Department of Civil Engineering, Wat. Res. vol. 31, No. 11 pp. 2840-2848, 1997 Elsevier Science Ltd. Printed in Great Britain.
Written Opinion of the International Searching Authority and International Search Report for International Application No. PCT/US2011/60785. USPTO (acting as International Searching Authority), 16 pgs., (dated May 23, 2012).
Lee, Quinton, Beeman, Biehle, Liddle, Ellis and Buchanan Jr., Scale-up issues for in situ anaerobic tetrachloroethene bioremediation, Dupont Central Research and Development, Journal of Industrial Microbiology & Biotechnology, 1997,18, pp. 106-115, 1997, USA.

\* cited by examiner

Emulsified concentrate

| Day | PCE | TCE | tDCE | cDCE | 1,1 DCE | VC | ethene |
|---|---|---|---|---|---|---|---|
| 0 | 19.54 | 0.00 | 0.00 | 0.00 | 0.00 | 0.00 | 0.00 |
| 2 | 19.50 | 0.00 | 0.00 | 0.00 | 0.00 | 0.04 | 0.21 |
| 22 | 18.70 | 0.36 | 0.00 | 0.48 | 0.00 | 0.00 | 0.00 |
| 46 | 12.74 | 1.47 | 0.00 | 5.32 | 0.00 | 0.00 | 0.00 |
| 72 | 5.97 | 0.69 | 0.00 | 12.31 | 0.10 | 0.07 | 0.41 |
| 105 | 7.70 | 0.97 | 0.00 | 10.14 | 0.00 | 0.05 | 0.68 |
| 150 | 0.25 | 0.26 | 0.00 | 4.87 | 0.00 | 0.01 | 0.26 |
| 191 | 0.00 | 0.00 | 0.00 | 4.56 | 0.00 | 0.01 | 0.00 |

Magnetite nanoparticle

| Day | PCE | TCE | tDCE | cDCE | 1,1 DCE | VC | ethene |
|---|---|---|---|---|---|---|---|
| 0 | 19.54 | 0.00 | 0.00 | 0.00 | 0.00 | 0.00 | 0.00 |
| 2 | 18.5 | 0.00 | 1.57 | 0.00 | 0.00 | 0.033649 | 0.19907 |
| 21 | 14.83 | 1.96 | 0.00 | 1.57 | 1.18 | 0.00 | 0.00 |
| 42 | 7.53 | 2.50 | 1.53 | 6.88 | 0.47 | 0.16 | 0.46 |
| 71 | 0.00 | 0.24 | 1.40 | 17.25 | 0.87 | 0.21 | 0.44 |
| 105 | 0.00 | 0.00 | 0.94 | 17.65 | 0.12 | 0.24 | 0.79 |
| 150 | 0.00 | 0.00 | 0.00 | 6.06 | 0.00 | 0.03 | 0.10 |
| 191 | 0.00 | 0.00 | 0.00 | 4.89 | 0.00 | 0.12 | 0.00 |

Green Rust nanoparticle

| Day | PCE | TCE | tDCE | cDCE | 1,1 DCE | VC | ethene |
|---|---|---|---|---|---|---|---|
| 0 | 19.54 | 0.00 | 0.00 | 0.00 | 0.00 | 0.00 | 0.00 |
| 4 | 17.5 | 0.00 | 1.90 | 0.00 | 0.00 | 0.05 | 0.21 |
| 21 | 16.70 | 1.30 | 0.00 | 0.95 | 0.00 | 0.07 | 0.00 |
| 42 | 7.43 | 1.08 | 0.05 | 5.04 | 0.48 | 0.03 | 0.00 |
| 71 | 0.00 | 0.04 | 0.69 | 15.91 | 0.09 | 0.22 | 0.47 |
| 105 | 0.33 | 0.04 | 0.63 | 15.59 | 0.08 | 0.21 | 0.69 |
| 150 | 0.00 | 0.00 | 0.00 | 6.42 | 0.00 | 0.03 | 0.11 |
| 191 | 0.00 | 0.00 | 0.00 | 4.97 | 0.00 | 0.05 | 0.00 |

FIG. 9

Emulsified concentrate

| Day | PCE | TCE | tDCE | cDCE | 1,1 DCE | VC | ethene |
|---|---|---|---|---|---|---|---|
| 0 | 19.54 | 0.00 | 0.00 | 0.00 | 0.00 | 0.00 | 0.00 |
| 2 | 19.50 | 0.00 | 0.00 | 0.00 | 0.00 | 0.00 | 0.01 |
| 21 | 19.52 | 0.03 | 0.00 | 0.04 | 0.09 | 0.00 | 0.00 |
| 42 | 17.31 | 0.79 | 0.00 | 0.51 | 0.09 | 0.00 | 0.00 |
| 71 | 15.10 | 1.55 | 0.00 | 0.98 | 0.09 | 0.00 | 0.00 |
| 105 | 12.89 | 2.30 | 0.00 | 1.44 | 0.09 | 0.00 | 0.00 |
| 150 | 1.90 | 0.18 | 0.00 | 0.27 | 0.00 | 0.00 | 0.00 |
| 191 | 1.45 | 0.70 | 0.00 | 4.62 | 0.00 | 0.00 | 0.00 |

Magnetite nanoparticle

| Day | PCE | TCE | tDCE | cDCE | 1,1 DCE | VC | ethene |
|---|---|---|---|---|---|---|---|
| 0 | 19.53 | 0.00 | 0.70 | 0.00 | 0.00 | 0.00 | 0.00 |
| 2 | 17.70 | 0.00 | 1.84 | 0.00 | 0.00 | 0.00 | 0.00 |
| 21 | 17.81 | 0.04 | 0.00 | 0.06 | 0.39 | 0.02 | 0.00 |
| 42 | 18.04 | 0.32 | 0.02 | 0.18 | 0.99 | 0.00 | 0.00 |
| 71 | 10.77 | 2.03 | 0.00 | 0.90 | 0.98 | 0.00 | 0.00 |
| 105 | 4.60 | 0.76 | 0.00 | 0.18 | 0.35 | 0.00 | 0.00 |
| 150 | 1.70 | 2.88 | 0.00 | 1.25 | 0.00 | 0.00 | 0.00 |
| 191 | 0.53 | 1.45 | 0.00 | 6.63 | 0.00 | 0.00 | 0.00 |

Green Rust nanoparticle

| Day | PCE | TCE | tDCE | cDCE | 1,1 DCE | VC | ethene |
|---|---|---|---|---|---|---|---|
| 0 | 19.67 | 0.00 | 0.73 | 0.00 | 0.00 | 0.00 | 0.00 |
| 2 | 17.50 | 0.00 | 2.04 | 0.00 | 0.00 | 0.00 | 0.00 |
| 21 | 16.03 | 0.03 | 0.00 | 0.06 | 1.47 | 0.00 | 0.00 |
| 42 | 13.47 | 0.05 | 0.00 | 0.14 | 1.16 | 0.00 | 0.03 |
| 71 | 9.67 | 0.08 | 0.00 | 0.16 | 0.70 | 0.00 | 0.00 |
| 105 | 4.60 | 0.05 | 0.00 | 0.06 | 0.46 | 0.00 | 1.00 |
| 150 | 1.83 | 0.00 | 0.00 | 0.27 | 0.00 | 0.00 | 0.00 |
| 191 | 4.00 | 0.52 | 0.00 | 0.19 | 0.00 | 0.00 | 0.00 |

FIG. 10

MICROEMULSIONS AND USES THEREOF IN DISPERSING CATALYSTS

CROSS-REFERENCE TO RELATED APPLICATIONS

This application is a national stage entry of International Application No. PCT/US11/60785, filed Nov. 15, 2011, which itself claims priority to U.S. Provisional Patent Application No. 61/413,761, filed Nov. 15, 2010, each of the contents of the entirety of which are incorporated by this reference.

TECHNICAL FIELD

Various non-limiting embodiments of the disclosure are directed toward compositions that may be used for converting contaminants into innocuous derivatives thereof. Non-limiting embodiments include, but are not limited to, compositions that facilitate degradation of certain chemicals by abiotic catalysis.

BACKGROUND

Research into the anaerobic degradation pathways of chlorinated ethenes, ethanes, and other anaerobically degradable contaminants has begun to evaluate the biotic and abiotic contributions to overall contaminant degradation. The idea of combined mechanisms has not been investigated as the remediation industry grew from two major approaches, a biological approach and a chemical oxidation approach.

In-situ bioremediation (ISB) of contaminants is practiced commercially and is effective on contaminants that are degraded by being reduced or oxidized. Biological processes mainly revolved around the application of a carbon substrate to enhance reductive dechlorination. The bioremediation of contaminants requires four components: microorganisms, electron donors, electron acceptors, and nutrients.

In the case of oxidative bioremediation, the contaminants are the electron donors and oxygen is the electron acceptor. Crude oil would be the best example of a contaminant that benefits from oxidative bioremediation.

For reductive bioremediation, the contaminants are the electron acceptors and an organic compound is the electron donor. Reductive bioremediation is applicable to halogenated compound, nitroamines, perchlorates, metals and other compounds that can be degraded, precipitated or immobilized by being reduced. Examples include (Reference: Handbook of Environmental Degradation Rates, Philip H. Howard, et al., 1991 by CRC Press LLC), but are not limited to: halogenated ethenes, halogenated ethanes, halogenated methanes, straight-chain halogenated hydrocarbons, halogenated aromatics, halogenated organic compounds, polycyclic halogenated compound such as polychlorinated biphenyls (PCB); nitrates, nitrites, sulfates; explosives, munitions, nitroaromatics; perchlorates, chlorates; dioxins, polychlorinated dibenzo-p-dioxins (PCDDs), polychlorinated dibenzofurans (PCDFs); methyl tertiary butyl ether (MTBE); pesticides, herbicides, insecticides, defoliants and other agricultural chemicals; N-nitrosodium-ethylamine (NDMA); organic dyes (Orange III, Chrysoidin, Tropaeolin O, etc); radio nucleotides; metals including but not limited to copper, molybdenum, uranium, chromium, selenium, vanadium, arsenic, silver, antimony, cadmium, lead, mercury, thallium, tin, cobalt, iron, manganese, nickel, zinc, aluminum, gold, barium, radium, and magnesium.

Many different organic carbons have been used commercially to stimulate reductive bioremediation process including: volatile fatty acids and derivatives including sodium lactate, potassium lactate, ethyl lactate/dipropionate, citric acid; sugars including molasses, sucrose, glucose, fructose; oils including vegetable oil, emulsified vegetable oil, oil mixes, gasoline/diesel; polymerized poly-lactate; and solids including chitin, whey, wood mulch.

The one evolution was the use of emulsified vegetable oil as a common slow release substrate.

Chemical reduction of contaminants utilizing metals and metal minerals has also been used commercially for many years. Zero Valent Iron (ZVI) is the most widely used in-situ chemical reluctant (ISCR) of this type. Early incarnations of this technology utilized iron filings filled trenches to form permeable reactive barriers (PRBs). More recent examples include ZVI powder mixed with solid carbohydrates and nano and micro scale ZVI mixed with vegetable oil emulsions. There is also research on injecting soluble iron compounds and a chemical or biological reducing agent and forming metal minerals in-situ. All of these technologies use iron or iron minerals to reduce contaminant with abiotic processes. The main challenge with the introduction of an ISCR is a general inability to transport the material away from the injection points to ensure adequate coverage.

Contaminants are reduced when they contact the surface of the ISCR. This reduces the contaminant and oxidizes the ISCR. The transfer of electrons occurs at the surface of the ISCR. In the case of chlorinated ethenes, the transfer of electrons facilitates the beta elimination of two chlorines from the contaminant. In the case of trichloroethene (TCE), it is transformed by this process into chloroacetylene. Because the ISCR surface has been partially oxidized its reactivity has been lowered. One advantage of combining ISCR with ISB is that the fermenting carbon substrate will donate electrons to the surface of the ISCR particles which will re-reduce the surface and maximize the reactivity.

Because contaminant reactions occur on the surface of ISCR particles, their reactivity is proportional to their surface area. The ability to make smaller particles will result in higher degradation rates. These materials are typical injected into saturated soil and their distribution is limited by the pore throat sizes. Smaller particles will transport further on average than larger particles that are preferentially filtered out by the soil.

ISCR particles can be made of ferrous oxide, ferric oxide, magnetite, hematite, maghemite, ferrous hydroxide, ferric hydroxide, goethite, akaganeite, lepidocrocite, ferroxyhyte, ferrihydrite, schwertmannite, green rust, fougerite, iron sulfide, troilite, greigite, pyrrhotite, mackinawite, marcasite, pyrite, siderite, vivianite, iron, zero valent iron, zero valent zinc, zero valent aluminum, iron gluconate, cysteine, silver nitrate, iron sulfate, iron chloride, and iron lactate.

As the biological mechanisms of anaerobic metabolism became better understood, it became apparent that many degradation pathways could not be easily attributable to strictly biological processes, but fit easily into chemical reductive processes. Data from some sites where there is evidence of both processes suggest that there may even be a synergistic effect from biotic and abiotic processes.

The current paradigm considers combining the benefits of chemical reduction using ISCRs with reductive dechlorination through the addition of a carbon substrate. The problem for practitioners is how to mix an insoluble ISCR with a soluble organic substrate to form a stable injectate. The use of microemulsion technology to biologically enhance reductive dechlorination is a relatively new technology to the remediation industry. Microemulsions combine two immiscible materials with surfactants to form sub-micron-sized particles that are thermodynamically stable. Since microemulsions are stable systems with sub-micron particles, they exhibit superior subsurface transport. A significant advantage would be achieved if ISCRs could be incorporated into a microemulsion thereby combining both biological and abiotic mechanisms into one easily managed material that incorporates both biotic and abiotic remedial properties with the distribution characteristics of a liquid that transports in ground water like a miscible liquid.

DISCLOSURE OF INVENTION

The present invention fulfills these needs and discloses compositions useful for chemical reduction or dispersing a compound in water.

In one embodiment, a composition comprises a reductant and a microemulsion. The reductant is dispersed in the composition. In another embodiment, the reductant is located in a micelle formed by the microemulsion.

In another embodiment, a method of dispersing a compound comprises mixing a microemulsion with water, thus forming a phase, and dispersing a compound in the phase.

In yet a further embodiment, an aqueous composition comprises water, micelles comprising a surfactant, a co-surfactant and an organic phase comprising oil, soapstock, an acid oil of soapstock, a neutralized acid oil of soapstock and any combinations thereof, and means for converting a contaminant into an innocuous derivative thereof. At least a portion of the means for converting the contaminant into the innocuous derivative thereof is located within the micelle.

In a further embodiment, a method comprises placing a composition in contact with water, the composition comprising: soapstock, an acid oil of soapstock, a neutralized acid oil of soapstock and any combinations thereof; a compound selected from the group consisting of an emulsifier, a lactate ester, a lactate polymer, a polyhydric alcohol, carboxylic acids, salts of carboxylic acids and any combinations thereof; and an in-situ chemical reductant.

In another embodiment, a composition comprises a first component selected from the group consisting of soapstock, acid oil of soapstock, a neutralized acid oil of soapstock and any combinations thereof; a second component selected from the group consisting of ethoxylated monoglyceride, lecithin, sodium stearoyl lactylate, polylactate, ethyl lactate, a carboxylic acid, a salt of a carboxylic acid and any combinations thereof; and means for converting a contaminant into an innocuous derivative thereof. Upon placement of the composition in water comprising an amount of contaminant and after a period of time, at least a portion of the amount of contaminant is converted into an innocuous derivative thereof.

In yet a further embodiment, a composition comprises soapstock, acid oil of soapstock, a neutralized acid oil of soapstock, or any combinations thereof; ethyl lactate, polylactate, sodium stearoyl lactylate or any combinations thereof; lecithin, ethoxylated monoglyceride or a combination thereof; and an in-situ chemical reductant. Upon placement of the composition in water comprising an amount of contaminant and after a period of time, at least a portion of the amount of contaminant is converted into an innocuous derivative thereof.

In an additional embodiment, a system for introducing a composition into a source of water comprises a source of a composition comprising a microemulsion and an in-situ chemical reductant; a source of contaminated water; and a conduit configured for placing the composition in contact with contaminated water.

DESCRIPTION OF THE DRAWINGS

FIG. 9 shows the data used to produce FIG. 7.

FIG. 10 shows the data used to product FIG. 8.

MODES FOR CARRYING OUT THE INVENTION

Figure 1:
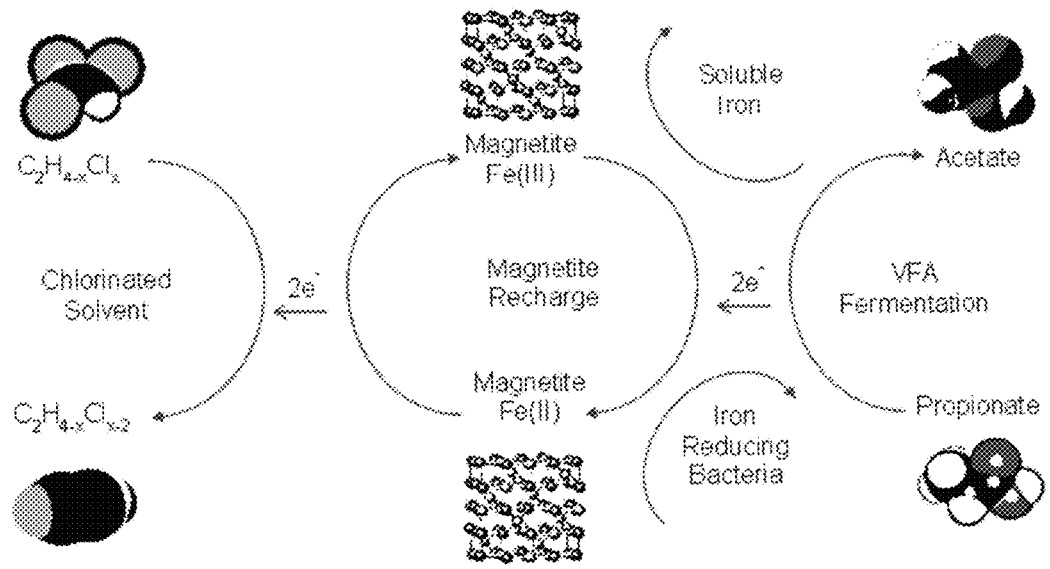
FIG. 1 shows the abiotic degradation of a contaminant that may be achieved with one embodiment of a composition of the present invention.

This disclosure describes several different features and has aspects of, and with reference to various exemplary, non-limiting embodiments. It is understood, however, that the disclosure embraces numerous exemplary embodiments, which may be accomplished by combining any of the different features, aspects, and embodiments described herein in any combination that one of ordinary skill in the art would find useful.

Chlorinated solvents are the most common class of ground water contaminants found at hazardous waste sites in the United States. In a list of the top 25 most frequently detected contaminants at such sites, the Agency for Toxic Substances and Disease Registry (ATSDR) found that ten of the top twenty contaminants were chlorinated solvents or their degradation products. National Research Council, Alternatives for Ground Water Cleanup (National Academy Press, Washington, D.C. 1994). The same survey found that a common contaminant, trichloroethylene (TCE), is present at more than 40% of the National Priority List sites. Remediation of ground water contaminated by these compounds presents unique obstacles related to their inherent characteristics, including hydrophobicity and high density. Recent advances in the understanding of biodegradation processes involving chlorinated solvents permit remediation of residual contamination source areas in low permeability, saturated or variably saturated soils at a much lower cost than conventional methods.

Metals, perchlorates, explosives, and other contaminants also appear on lists of contaminants frequently detected at hazardous waste sites. These contaminants present challenges to cleaning up such sites. In the reductive dechlorination process, chloroethenes act as electron acceptors. This implies that the process can be limited in the field by the availability of sufficient, suitable electron donors. Reductive dechlorination also can be totally or partially inhibited by the presence of competing inorganic electron acceptors such as oxygen, nitrate, iron, and sulfate. It is widely accepted that reductive dechlorination occurs to some extent at most field sites where chloroethene contamination exists in the presence of a sufficient supply of electron donors.

Interest has grown in using slow release electron donors in enhanced bioremediation (also referred to as bioaugmentation) systems for treating chlorinated solvents and other contaminants in groundwater. Slow release electron donors keep hydrogen levels low enough such that dechlorinating bacteria may use a greater percentage of the bioremediation composition than with the more readily available electron donors. If hydrogen levels become too high, methanogens may dominate the system. This interest in slow release electron donors is derived from the simplicity and low maintenance requirements of slow release systems relative to conventional systems that use continuous or semi-continuous addition of soluble electron donors, such as lactate or molasses. The costs of the electron donor may be a significant fraction of total process costs for slow release systems, making the selection of an efficient and low cost electron donor important to the efficacy and overall economics of these systems. Many oxidizable, organic compounds may be suitable electron donors. For a potential electron donor to be useful as a composition for bioremediation, it should be safe to use, facilitate the desired reaction, and be relatively inexpensive.

Carbon substrates may be used as electron donors to enhance reductive degradation of halogenated solvents, perchlorate and certain metals. Emulsified vegetable oil has been used as a carbon source for enhanced halorespiration. Different types of vegetable oils can be used in these applications, including, but not limited to, soy bean oil, sunflower, rapeseed, sesame, olive, canola, mustard and corn oil. These edible oils may include mixed glycerides. Some formulations of vegetable oil substrates are slowly degraded and may remain in the aquifer years beyond what is required, while others cannot be readily distributed in the aquifer matrix. Vegetable oil alone may not be utilized fast enough to support the strongly reducing conditions required for complete dehalogenation of solvents. In order to overcome the slow degradation rates inherent in these vegetable oil systems, sodium lactate is added to stimulate reducing conditions and build up the biomass. Problems with clogging of the aquifer may be overcome by adding emulsifying agents to lower the viscosity of the system and allow greater sub-surface dispersion.

In one embodiment, a low cost, high efficiency method for carrying out remediation of hazardous waste sites, contaminated ground water sources, and/or superfund sites is disclosed. In one embodiment, a reductant, such as an in-situ chemical reductant is combined with or incorporated into a microemulsion for the chemical or abiotic reduction of a contaminant. In other embodiments, methods of using certain compositions as electron donors for bioremediation in conjunction with abiotic remediation are disclosed.

In one embodiment, the reductant is a soluble metal salt.

There are several positive interactive effects of combining reductive particles with fermenting organic compounds. The first is that the fermenting organic supplies a surplus of electrons that can re-reduce oxidized sites on the ISCR particles allowing them to remain in their highest reactive state. It can also indirectly re-reduce the ISCR surfaces by reducing and solubilizing iron from the soil and by stimulating iron reducing bacteria.

A second positive effect of the combination is that those fermenting carbon substrates can biogenically form reduced and surface reactive minerals in-situ. For example, the fermenting carbon substrate into soil or ground water that contains metal containing compounds can generated reduced metals, metal oxides, metal hydroxides and others, and in the presence of sulfur containing compounds can form metal sulfides, pyrites, and more complex metal sulfur compounds.

A third interactive effect can solubilize iron and other metals out of the soil and into the ground water. These soluble and mobile reduced metals can then directly donate electrons to reduce contaminants present.

Finally, strongly reactive ISCR minerals like zero valent iron and others can form soluble hydroxide ions. These OH— ions can react with the acid formed during the carbon substrate fermentation and help buffer the system in an optimal bioremediation pH range of 5-9. That stable buffered optimal pH range optimizes the contaminant degradation rates from biologically mitigated processes.

FIG. 1 shows an example of these positive interactive effects of combining ISCR particles with ISB to abiotically degrade TCE to chloroacetylene. The organic carbon fermentation of propionate to acetate provides excess electrons to the system to re-reduce the surface of the magnetite (ISCR) directly or indirectly by solubilizing and mobilizing iron from soil and or stimulating iron reducing bacteria. Separately, the electrons donated from the carbon substrate fermentation can directly transform TCE to dichloroethene, primarily the cis confirmation.

In another embodiment, a series of studies were performed to show that ISCRs could be incorporated into a microemulsion. Several different ISCRs were successfully dispersed into a microemulsion carbon substrate forming a low viscosity, single phase liquid that retains the physical properties of a microemulsion. In another embodiment, this system was compared in a microcosm study with various ISCRs alone and abiotic "sterile" systems to demonstrate biotic, abiotic, and synergistic effects.

In another embodiment, the remediation may be aided by an inoculum. Certain contaminated materials (or sites) may contain indigenous microbial communities that are sufficient for complete bioremediation of contaminants. For such sites, there is no need to add microbes unless the indigenous microbes are genetically deficient in achieving the desired cleanup goals. For those sites that are microbiologically limited, microorganisms may be added to the contaminated materials (or sites). In one embodiment, the inoculum may be a mixed culture of halo-respiring bacteria that have been enriched to reach an optimal cell density. These mixed cultures of halo-respiring bacteria may be typically obtained from sediment samples from rivers, streams or any waterways. The inoculum used in the Examples was originated from a Sangamon River sediment sample (Lodge Park, Piatt County, Ill.) See, e.g., Brennan, R. A., Sanford, R. A. and Werth, C. J. (2006). "Biodegradation of Tetrachloroethene by Chitin Fermentation Products in a Continuous Flow Column System." *Journal of Environ. Engr.*, June 665-673. This culture had grown for several years on PCE, anaerobic basal salts medium, Wolfe's vitamin solution and various electron donors including lactate (1-2 millimolar (mM)), formate (4 mM) and chitin using the Volatile Interface Transfer Apparatus (VITA) reactor system at the University of Illinois. Brennan, R. A., and Sanford, R. A. (2002). "Continuous steady-state method using Tenax for delivering tetrachloroethene to chlororespiring bacteria." *Appl. Environ. Microbiol.*, 68(3), 1464-1467. In 2003, microscopic direct count estimates showed that the culture's density exceeded $1 \times 10^9$ cells/ml. Using 16S rRNA gene-specific primers, both *Dehalococcoides* and *Dehalobacter* spp. were detected. Quantitative real-time PCR has been used to determine that approximately $1.65 \times 10^7$ *Dehalococcoides* gene copies were present per ml of culture.

In order to assess the effect of the ISCR particles on bioremediation, the reactions may be carried out with or without the ISCRs and with and without inoculation and the results are measured. The ISCRs and the electron donors maybe added into a bioremediation mix in any physical forms, such as in either liquid or solid form. For purpose of this disclosure, "an amount sufficient to increase the kinetics of degradation" means an amount of a substance that will positively affect the kinetics of degradation when such a substance is added in such an amount to a reaction.

Figure 2:
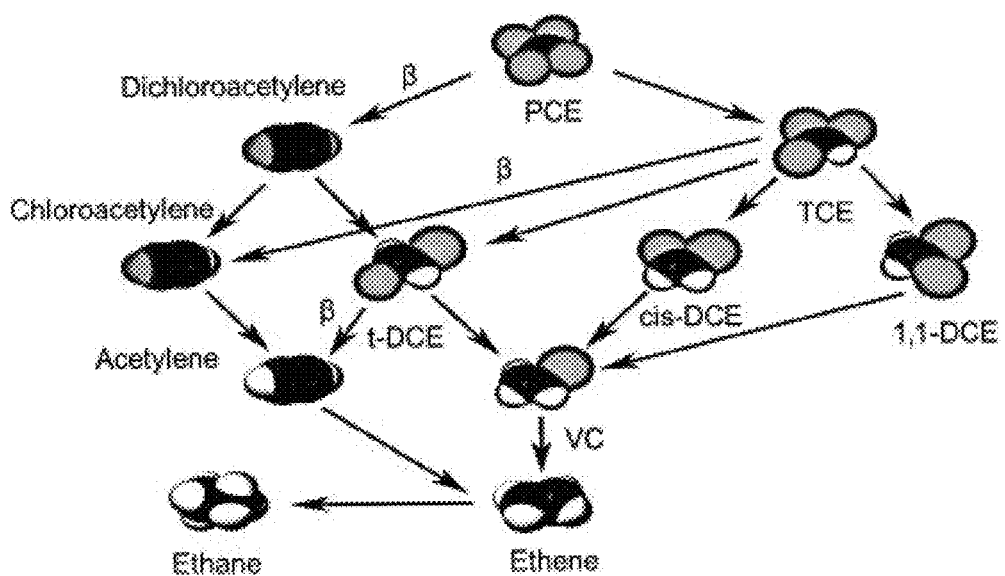
FIG. 2 shows the variety of biotic and abiotic degradation pathways for perchloroethene (PCE).

FIG. 2, derived from Derived from Arnold, W. A., Pathways of Chlorinated Ethylene and Chlorinated Acetylene Reaction with Zn(0), Environmental Science & Technology, 1998, 32, 3017-3025, shows the variety of biotic and abiotic degradation pathways for perchloroethene (PCE).

As described herein, each bottle used in a microcosm may be started with a certain amount of PCE. At subsequent times each bottle may be sampled for the degradation daughter products of PCE, such as trichloroethene (TCE), cis-dichloroethene (DCE), trans-DCE, 1,1-DCE, and vinyl chloride (VC). Because of the fast degradation rates of dichloroacetylene and chloroacetylene and ethane also daughter products of PCE and TCE and ethane respectively, they may not be detectable. Also, based on analytical interference, values reported for ethene can contain the sum of both ethene and acetylene in the system.

The rate of degradation may be determined by calculating the number of µmoles of chloride ions removed from PCE and subsequently from the amounts of the daughter products generated. The calculation may be performed as follows:

Chloride (µmoles)=Starting PCE (µmoles)−4×PCE (µmoles)−3×TCE (µmoles)−2×DCE (µmoles)−VC(µmoles).

An alternative calculation may be used for low activity sets that do not generate many daughter products or sets where the uninoculated control shows loss of PCE. The alternative chloride calculation is: Chloride (µmoles)=TCE (µmoles)+2×DCE (µmoles)+3×VC(µmoles)+4× Ethene (µmoles).

Some embodiments contain figures showing the relative amount of dechlorination daughter products remaining at the sampling points near the end of each experiment. A bioremediation amendment showing ethene generation at this stage may be considered to have successfully demonstrated its ability to be an electron donor for the bioremediation of contaminants in water, or other sources.

In other embodiments, methods and compositions for cleaning up metals, perchlorates, explosives, and other contaminants that appear on lists of contaminants detected at hazardous waste sites are disclosed.

In one embodiment, a method comprises placing a composition in contact with water. After a period of time, if the water comprises a contaminant, the presence of the composition in the water results in the contaminant being converted into an innocuous derivative thereof.

In one embodiment, an in-situ chemical reductant is incorporated into a microemulsion for the chemical or abiotic reduction of a contaminant. Examples of in-situ chemical reductants include, but are not limited to: metals that are able to donate electrons as they are oxidized including, without limitation, iron, zero valent iron, iron II and iron III, such metals may be in the form as a soluble inorganic, i.e., iron chloride, or soluble organic, i.e., magnesium gluconate; metal minerals that can act as catalysts for the decomposition of a contaminant including, but not limited to, metal sulfides, layered double hydroxides, i.e., green rusts, spinal group metals, i.e., magnetites, iron chloride, magnesium sulfate, iron hydroxide; and chelated metals including, but not limited to, metal gluconates.

In another embodiment, a method comprises placing a composition comprising soapstock, an acid oil of soapstock or a combination thereof and a compound selected from the group consisting of an emulsifier, a lactate ester, a lactate polymer, a polyhydric alcohol, carboxylic acids, salts of carboxylic acids, and any combinations thereof in contact with water. After a period of time and if the water comprises a contaminant, the presence of the composition in the water results in the contaminant being converted into an innocuous derivative thereof.

In yet a further embodiment, a composition comprises: soapstock; ethyl lactate, sodium stearoyl lactylate, polylactate, or a combination thereof; and lecithin.

In a further embodiment, a composition consists essentially of: soapstock; ethyl lactate, sodium stearoyl lactylate, polylactate, or a combination thereof; and lecithin.

In another embodiment, a composition comprises: lecithin; ethoxylated monoglycerides; soap stock, acid oil, neutralized acid oil, or any combinations thereof; and ethyl lactate.

In still another embodiment, a composition comprises lecithin; a compound having at least 20% fatty acids; ethoxylated monoglycerides; and ethyl lactate.

In a further embodiment, a composition comprises: a first component selected from the group consisting of soapstock, acid oil of soapstock, a neutralized acid oil of soapstock, and any combinations thereof; ethyl lactate; and a second component selected from the group consisting of ethoxylated monoglyceride, lecithin, sodium stearoyl lactylate, polylactate, carboxylic acid, salt of a carboxylic acid, and any combinations thereof.

In an additional embodiment, a composition consists essentially of: soapstock, acid oil of soapstock, a neutralized acid oil of soapstock, and any combinations thereof; and a compound selected from the group consisting of ethyl lactate, polylactate, ethoxylated monoglyceride, lecithin, sodium stearoyl lactylate, carboxylic acids, salts of carboxylic acids, and any combinations thereof.

In one embodiment, a method comprises placing a composition including means for converting a contaminant to an innocuous derivative thereof in contact with water. The composition comprises soapstock, an acid oil of soapstock, a neutralized acid oil of soapstock and any combinations thereof. The composition further comprises a compound selected from the group consisting of an emulsifier, a lactate ester, a lactate polymer, a polyhydric alcohol, carboxylic acids, salts of carboxylic acids, and any combinations thereof.

In a further embodiment, a composition comprises a first component selected from the group consisting of soapstock, acid oil of soapstock, a neutralized acid oil of soapstock and any combinations thereof; and a second component selected from the group consisting of ethoxylated monoglyceride, lecithin, sodium stearoyl lactylate, polylactate, ethyl lactate, a carboxylic acid, a salt of a carboxylic acid and any combinations thereof. Upon placement of an effective amount of the composition in water comprising an amount of contaminant and an abiotic catalyst and after a period of time, at least a portion of the amount of contaminant is converted into an innocuous derivative thereof.

In yet a further embodiment, a system for introducing a composition comprising an abiotic catalyst into a source of water comprises a source of a composition comprising soapstock, an acid oil of soapstock, a neutralized acid oil of soapstock and any combinations thereof. The system further includes a source of contaminated water and a conduit configured for placing the composition comprising the abiotic catalyst in contact with contaminated water.

Methods of using the compositions described herein for remediation and systems employing the compositions of described herein for remediation are further disclosed. In a yet another embodiment, methods and compositions are described for replacing the use of expensive vegetable oils in remediation. In a yet another embodiment, novel compositions for remediation based on vegetable oil soap stocks are described.

In other embodiments, an emulsified soap stock system may function as an electron donor for reductive degradation of contaminants in ground water, waste water, waste cleanup locations, and/or other contaminated sites. In another embodiment, the composition that may function as the electron donor may include, but is not limited to, vegetable oil refining by-products, crude oil/partially refined vegetable oils, refining by-product/by- or co-products of vegetable oil refining, acid oil or neutralized acid oils, salts and esters of organic acids and the like.

In one embodiment "soapstock byproduct" or "soapstock" may include a byproduct that is filtered from a crude or partially refined vegetable oil during the manufacture of a refined vegetable oil. The soapstock may contain about 30% to 40% fatty acid, with the remainder of the soapstock being water, lecithin, gums, glycolipids or other compounds. Soapstock may be an alkaline emulsion comprising water, acylglycerols, phosphoacylglycerols, and free fatty acids. In another embodiment, oil may be used in addition to or in place of the soapstock.

The raw soapstock may be acidified, as by sulfuric acid treatment of the soapstock, so as to cause the soapstock to separate into three layers including a top layer of fatty acids, an interface byproduct or middle layer called "skimmings", and a bottom layer of acidic water. The three layers are visible to the naked eye and are each pumped off in sequence from the separated treated soapstock. The fatty acids from the top layer of the separated, treated soapstock have long been considered a product of the acidification treatment of the soapstock (acid oil), and these fatty acids from the top layer of the separated treated soapstock may be used in agricultural feed products. The "acid oil" neutralized with sodium hydroxide may be referred to as "neutralized acid oil" which contains sodium salts of free fatty acids and other compounds.

In yet another embodiment, a composition comprising a compound that may function as an electron donor is intermixed with a surfactant, a polyhydric alcohol, lecithin and/or a water soluble polymer. In certain embodiments, the surfactant may comprise a compound including, but not limited to, fatty amine oxides; quaternary ammonium compounds; betaines; sugar-derived surfactants; alkyl polyglycosides; polysorbate; polyglycerol esters; fatty alcohol ethoxylates; fatty alkanolamide; polyglycol ethers; block copolymers; vegetable oil ethoxylates; fatty acid ethoxylates; alpha olefin sulfonate; sodium lauryl sulfates; sarcosinates; sulfosuccinates; isethionates; ether sulfates; and combinations of any thereof.

In certain other embodiments, the polyhydric alcohol may include, without limitation, methanol, ethanol, n-propanol, isopropanol, ethylene glycol, propylene glycol, glycerol, and combinations of any thereof.

In other embodiments, the lecithin may include, without limitation, crude lecithin, de-oiled lecithin, fluid lecithin, chemically modified lecithin, enzymatically modified lecithin, lecithin blends with high HLB emulsifiers or combinations of any thereof. In one embodiment, the chemically modified lecithin may be an acetylated and hydroxylated lecithin such as Thermolec WFC brand lecithin available from Archer-Daniels-Midland Company of Decatur, Ill.

In certain other embodiments, the emulsifier may be include, but not be limited to, lecithins, chemically modified lecithins, enzymatically modified lecithins, sodium stearoyl lactylates, steroyl lactylic acid, sodium oleyl lactates, oleyl lactilic acid, mono- and di-glycerides, ethoxylated mono and di-glycerides, fatty amine oxides, quaternary ammonium surfactants such as bile salts, betaines, sugar-derived surfactants, alkyl polyglycosides, polysorbates, polyglycerol esters, fatty alcohol ethoxylates, fatty alkanolamides, polyglycol ethers, block copolymers, vegetable oil ethoxylates, fatty acid ethoxylates, alpha olefin sulfonates, sodium lauryl sulfates, sarcosinates, sulfosuccinates, isothionates, ether sulfates, or combinations of any thereof.

In another embodiment, the compound may function as the electron donor and may be one or more of the compounds including, but not limited to, lactic acid, formic acid, whey, propylene glycol, glucose, fructose, sorbitol, vegetable oil, zero valent iron, molecular hydrogen, ethylene glycol, acetic acid, propionic acid, succinic acid, gluconic acid, butyric acid, capryic acid, modified vegetable oil, diglycerides, glycerol, lactate esters, polylactates, ethanol, methanol, corn syrup, molasses, soap stock, acid oil, emulsified soap stock, carboxylic acids, salts of carboxylic acids, and combinations of any thereof.

In another embodiment, an abiotic catalyst may be used to convert a contaminant into an innocuous derivative thereof by dispersing the abiotic catalyst in solution with a microemulsion as described herein.

Figure 3:
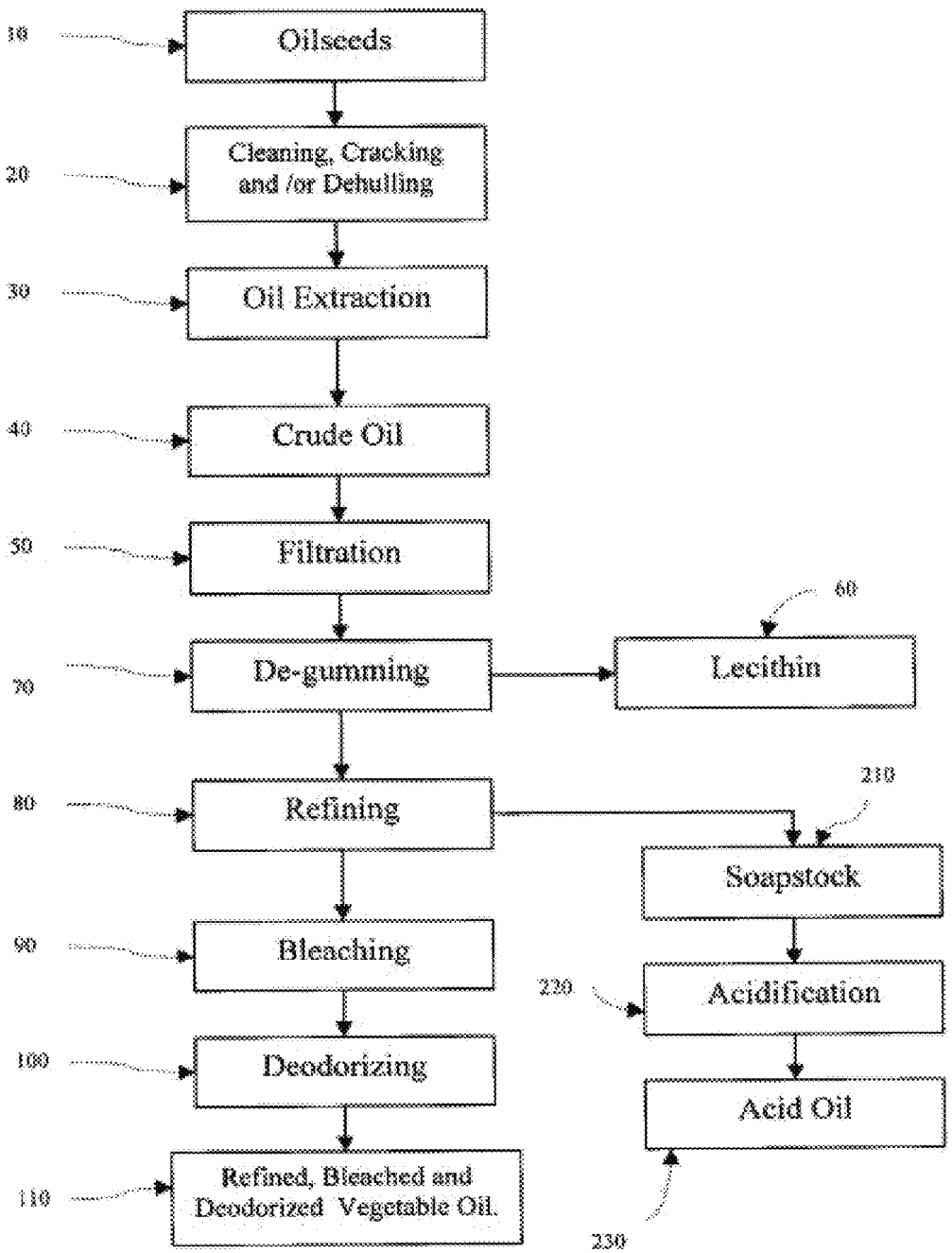
FIG. 3 is a schematic of a process for vegetable oil processing that may be used to produce soapstocks, acid oils or other by-products of vegetable oil refining that may be used in one embodiment of producing compositions as those described herein.

In one embodiment, soybean soap stock may be used. Soybean soap stock is an inexpensive byproduct that may be obtained from a caustic refining process of crude vegetable oil such as the process described in FIG. 3. The soapstock may contain 20-30% of sodium salts of fatty acids, 15-25% oil and about 50-60% water in addition to small amounts of phospholipids, glycolipids or gums.

Various non-limiting embodiments of this disclosure may include, without limitation, the use of various formulations of emulsifiable substrates including, but not limited to, those containing soap stock as the slow release electron (or hydrogen) donors for the dehalogenation of solvent contaminated groundwater. Some soap stock-based formulations may be mixed with ethyl lactate and emulsifiers, thus, forming emulsifiable oil substrates (EMO). These formulations may be added to a contaminated environment to facilitate the remediation of the contaminants present within the contaminated environment.

In other non-limiting embodiments, the emulsifiable oil substrate may be intermixed with one or more of a component including, but not limited to, an emulsifier, an electron donor, a polyhydric alcohol, lecithin, and any combinations thereof. In yet other embodiments, monoglycerides or modified monoglycerides may also be added. The emulsifiable oil substrate may include, without limitation, monoglycerides, diglycerides, triglycerides, free fatty acids, and combinations of any thereof.

In yet other embodiments, the compositions described herein may be applied to contaminated waste water sites using a variety of techniques available to those or ordinary skill in the art. In some embodiments, a concentrate of oil in water emulsifiable moderate viscosity emulsion may be produced while in other embodiments, oil in water emulsion may be produced. The concentrate or oil in water emulsion may be diluted to 0.5 to 50% organic concentration, thus, forming a low viscosity water emulsion that may be injected into a subsurface by means of direct push injection, pressure injection into a well or gravity fed into a well.

In other embodiments, it may be advantageous to inject the concentrate or oil in water emulsion as is, that is without dilution. In the case of the concentrate, a permeable reactive barrier (PRB) may be formed by injecting the concentrate without any water dilution. This slightly viscous liquid will not move very far from the injection point, will emulsify and move down gradient slowly as the groundwater moves past the edges of the slightly viscous liquid. In the case of the emulsion, the emulsion may be injected at delivered concentrations in the case where the soil can only take small volumes of liquid or where broad distribution of organics is not required. In situations where there are few injection points and large lateral distribution is necessary, the concentrate or the oil in water emulsion may be diluted to below 5% organics. The concentrate or the oil in water emulsion may be diluted by mixing with the appropriate amount of water and applying low to moderate shear.

One embodiment of a dilution system may be to meter the concentrate or oil in water emulsion and water into a mixing tee at the appropriate ratio. The tee may be an in line mixer. In some embodiments, with the appropriate turbulence in the tee, an in line mixer may not be necessary. Another embodiment of this disclosure would be to apply shear in a mix tank using agitation or air jet.

Once emulsified at a suitable injection concentration, the water emulsions may be injected at a wide range of pressures, limited only by the ratings of the equipment.

In other embodiments, a composition comprising soap stock; lecithin; a compound selected from the group consisting of ethyl lactate, sodium stearoyl lactylate, polylactate, and combinations of any thereof, and a compound selected from the group consisting of triglycerides, diglycerides, sugar alcohols, ethoxylated monoglycerides, fatty acid ethoxylates, sorbitan monoester, polyoxyethylene alkyl ethers, polyoxyethylene alkyl esters, sorbitan alkyl esters, polyoxyethylene sorbitan alkyl esters, glycerol esters, short chain fatty alcohols, acids, esters, glycerols, glycols, derivatives of any thereof, and combinations of any thereof is disclosed.

In another embodiment, a composition comprises soap stock; lecithin; a compound selected from the group consisting of ethyl lactate, sodium stearoyl lactylate, polylactate, and any combination thereof, and a compound selected from the group comprising sorbitan monostearate, polyoxyethylene ester of rosin, polyoxyethylene dodecyl mono ether, polyoxyethylene-polyoxypropylene block copolymer, polyoxyethylene monolaurate, polyoxyethylene monohexadecyl ether, polyoxyethylene monooleate, polyoxyethylene mono(cis-9-octadecenyl)ether, polyoxyethylene monostearate, polyoxyethylene monooctadecyl ether, polyoxyethylene dioleate, polyoxyethylene distearate, polyoxyethylene sorbitan monolaurate polyoxyethylene sorbitan monooleate, polyoxyethylene sorbitan monopalmitate, polyoxyethylene sorbitan monostearate, polyoxyethylene sorbitan trioleate, polyoxyethylene sorbitan tristearate, polyglycerol ester of oleic acid, polyoxyethylene sorbitol hexastearate, polyoxyethylene monotetradecyl ether, polyoxyethylene sorbitol hexaoleate, fatty acids, tall-oil, hexaester with sorbitol, ethoxylated castor oil, ethoxylated soybean oil, ethoxylated polyoxyethylene sorbitol tetraoleate, fatty acids, tall-oil, mixed esters with glycerol and polyethylene glycol, alcohols, C9-16 and ethoxylated derivatives of any thereof, and combinations of any thereof.

In another embodiment, a surfactant used in the various compositions may have a hydrophile-lipophile balance (HLB) between about 8.0 and about 30.0.

In another embodiment, a system comprising a conduit to convey a composition of the present invention to contaminated water or a conduit to convey contaminated water to a composition of the present invention, a zone where the contaminated water and a composition of the present invention mix. The conduit may be a direct push rod connected to a pump to inject a composition of the present invention under pressure, a well that is gravity fed or attached to a pump and feed under pressure, a tube or injection port on a hand held kit, or piping used in laboratory testing equipment. The mixing zone may be followed by a reaction zone where a composition of the present invention facilitates the bioremediation of a contaminant.

In additional embodiments, the system may also include an extraction zone where a conduit removes liquid from the reaction zone and recirculates the liquid to equipment where a composition of the present invention may be added to the extracted liquid before being re-injected into the injection zone. The extracted liquid may contain residual composition, contaminants, remediated water or mixtures thereof.

In certain embodiments, a microorganism capable of bioremediation may be placed in combination with a composition of the present invention and the contaminant. In one aspect, the contaminant is converted into an innocuous derivative. Such compositions may be referred to as bioaugmentative.

In other embodiments, a buffer may be added to a composition of the present invention. In some instances, it may be desired or necessary to help control the pH where a bioremediation microorganism is present. In such instances, it may be necessary to control the pH within the tolerance range for the bioremediation microorganism in order to have an impact on the microbial growth and survival.

In one embodiment, a composition of the present invention may be used in an environment that lowers the pH of the composition. In such instance, a buffer may be used to control the pH of the composition of the present invention in such an environment. This may be done by using an alkaline buffer. An alkaline buffer is a substance with a pH of over 7.0 that has been added to a material to neutralize harmful acids or to act as an alkaline reserve for the purpose of counteracting acids that may form in the future. Buffers that may be used include, but are not limited to sodium, potassium, magnesium or calcium carbonate, acetate or citrate.

The use of a buffered composition of the present invention may have utility in certain situations. For instance, bioremediation is often performed with an electron donor (biostimulation) to achieve geochemical conditions in groundwater that favor the growth of the dechlorinating microorganisms in the bioaugmentation culture. Sometimes, this biostimulation may be subject to extreme environmental conditions, such as high concentrations of chloroform, which may lead to inhibition of reductive dechlorination.

Thus, it may be desired to control key environmental factors (like the pH, the organic concentrations and electron acceptors) before, during and after injections of a bioremediation composition in order to provide an environment where the added organism has the most ideal situation for survival. For example, a pH of greater than 6 may lower the ionization of the mineral grains and coatings, and can inhibit the transportation of the bioremediation composition through the environment.

In yet an additional non-limiting embodiment, a composition of the present invention may be produced at a first geographic location and transported or shipped to a second geographic location. For instance, a facility at the first geographic location may be able to produce a product more economically than a facility at the second location due to various factors. The factors may include, for example, lower costs of materials, lower costs of energy (e.g., electricity and/or natural gas or other petroleum products), lower costs of labor (e.g., wages paid to employees), lower costs of environmental controls or effects, or any other requirement for production of the compositions. Thus, the costs of producing the products in the first geographic location may be less than the costs of producing the products in the second geographic location, resulting in the production costs being less in the first geographic location.

In such an instance, the compositions may be produced at the first geographic location and shipped to the second geographic location such as by transport over water with ships or barges, trucking, flying, by rail, or other means of transportation. The geographic location may be a county, a state, a country, a continent, and/or combinations of any thereof. In this manner the product may be produced, for example, in a first county, state, country, or continent, and transported to and/or sold in a second county, state, country, or continent.

In another embodiment, a container or container system may comprise a water soluble (or water dispersible) substance. Each water soluble container may contain a composition of the present invention that does not substantially dissolve the bag, or bags, which it contacts. In such cases, two compositions of the present invention may be stored in the inner and outer bag, respectively, which need not be mixed until the time of application. Such a bag system enables the ease of application of the compositions described herein to managers of waste sites, contaminated ground water locations, water treatment plants, and other suitable sources of water.

Suitable water soluble substances used for the manufacture of such bags or containers may comprise polyethylene oxide, such as polyethylene glycol; starch and modified starch; alkyl and hydroxyalkylcellulose, such as hydroxymethylcellulose, hydroxyethylcellulose, hydroxypropyl cellulose; carboxymethylcellulose; polyvinylethers such as poly methyl vinylether or poly(2-methoxyethoxyethylene); poly (2,4-dimethyl-6-triazinylethylene; poly(3-morpholinyl ethylene); poly(N-1,2,4-triazolylethylene); poly(vinylsulfonic acid); polyanhydrides; low molecular weight melamine-formaldehyde resins; low molecular weight urea-formaldehyde resins; poly(2-hydroxyethyl methacrylate); polyacrylic acid and its homologs, and combinations of any thereof. The water-soluble polymer films used in this disclosure may be of any suitable film-forming material such as polyvinyl alcohol, methyl cellulose, poly (hydroxyalkanoate) (PHA), poly(lactate) (PLA), polymethylene oxide, sodium carboxy methyl cellulose, polyvinyl pyrrolidone or polyacrylamide selected in the film thickness used and particular form of packaging to for polymer film that is both sufficiently tough and flexible to withstand fabrication, filling, and handling. Bags and packages of such type are described in U.S. Pat. Nos. 5,558,228 and 5,323,906, which are incorporated herein by reference in their entirety.

In one embodiment, a composition of the present invention may be in the form of a microemulsion. In this embodiment, the microemulsion may be characterized as clear, stable, isotropic liquid mixture of oil, an aqueous phase and surfactant, possibly in combination with a cosurfactant. In other embodiments the aqueous phase may contain salt(s) and/or other ingredients, and the "oil" phase may include a mixture of hydrocarbons and olefins. The microemulsions described herein form upon simple mixing of the components and may not require the high shear conditions generally used in the formation of ordinary emulsions. In another embodiment, the microemulsions of the present invention may be referred to as transparent emulsions/dispersions or swollen micelles with particles <100 nm (0.1 µm) in size, whereas an ordinary emulsion may be opaque with particles >400 nm (0.4 µm) and may be easily visible under a microscope.

The various embodiments of this disclosure are further explained by use of the following illustrative examples. The following examples are provided for illustrative purposes and are not intended to be limiting. The chemicals and other ingredients are presented as exemplary components or reactants and various modifications may be derived in view of the foregoing disclosure and all such modifications are within the scope of the invention.

EXAMPLE 1

This embodiment described one method of preparing a bioremediation composition of the present invention using soy soapstock.

A microemulsion composition was prepared by mixing: soy soapstock (available from Archer-Daniels-Midland-Company, Decatur Ill.) in an amount of 38% by weight; ethyl lactate (available from Archer-Daniels-Midland Company, Decatur Ill.) in an amount of 45% by weight; ethoxylated monoglyceride (available from BASF, Florham Park, N.J.) in an amount of 12% by weight; and lecithin (Thermolec WFC, a chemically modified lecithin available from Archer-Daniels-Midland-Company, Decatur Ill.) in an amount of 5% by weight.

The compounds were mixed and homogenized under high shear mixing for between 30 minutes to 60 minutes at ambient temperature. The microemulsion was poured into a 250 ml graduated cylinder and observed for any separation. The microemulsions were stable over one month at room temperature. The particle size distribution and photo micrographs showed a tight distribution of particle size.

EXAMPLE 2

This embodiment describes a method of preparing a bioremediation composition using soy soap stock.

A microemulsion composition was prepared by mixing: soy soapstock (available from Archer-Daniels-Midland Company, Decatur Ill.) in an amount of 32% by weight; ethyl lactate (available from Archer-Daniels-Midland Company, Decatur Ill.) in an amount of 44% by weight; ethoxylated monoglyceride (available from BASF, Florham Park, N.J.) in an amount of 15% by weight; lecithin (Thermolec WFC, a chemically modified lecithin available from Archer-Daniels-Midland Company, Decatur Ill.) in an amount of 5% by weight; and polylactate in an amount of 4% by weight.

The components were mixed and homogenized under high shear mixing for between 30 minutes and 60 minutes at ambient temperature. The microemulsion was poured into a 250 ml graduated cylinder and observed for any separation. The microemulsions were stable over one month at room temperature. The particle size distribution and photo micrographs showed a tight distribution of particle size.

EXAMPLE 3

This embodiment describes a method of preparing a bioremediation composition using soy soap stock.

A microemulsion concentrate was prepared by mixing: soy soapstock (available from Archer-Daniels-Midland Company, Decatur Ill.) in an amount of 38% by weight; crude glycerol (available from Archer-Daniels-Midland Company, Decatur Ill.) in an amount of 20% of total soapstock weight; ethyl lactate (available from Archer-Daniels-Midland Company, Decatur Ill.) in an amount of 45% by weight; ethoxylated monoglyceride (available from BASF, Florham Park, N.J.) in an amount of 12% by weight; and lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsion was stable over one month at room temperature. The particle size distribution and photo micrographs showed a tight distribution of particle size.

EXAMPLE 4

This embodiment describes a method of preparing a bioremediation composition using soy soap stock.

A microemulsion composition was prepared by mixing: soy soapstock (available from Archer-Daniels-Midland Company, Decatur Ill.) in an amount of 32% by weight; crude glycerol (available from Archer-Daniels-Midland Company, Decatur Ill.) in an amount of 20% of total soapstock weight; ethyl lactate (available from Archer-Daniels-Midland Company, Decatur Ill.) in an amount of 44% by weight; polylactate produced as described in Example 3, in an amount of 4% by weight; ethoxylated monoglyceride (available from BASF, Florham Park, N.J.) in an amount of 15% by weight; and lecithin (Thermolec WFC, a chemically modified lecithin available from Archer-Daniels-Midland Company, Decatur Ill.) in an amount of 5% by weight.

The components were mixed and homogenized under high shear mixing for between 30 minutes to 60 minutes. The microemulsion was poured into a 250 ml graduated cylinder and observed for any separation. The microemulsion was stable over one month at room temperature. The particle size distribution and photo micrographs showed tight distribution of particle size.

EXAMPLE 5

This embodiment describes a method of preparing a bioremediation composition using soy soap stock.

A microemulsion composition was prepared by mixing: acid oil of soy soapstock (available from Archer-Daniels-Midland Company, Decatur Ill.) in an amount of 46% by weight; ethyl lactate (available from Archer-Daniels-Midland Company, Decatur Ill.) in an amount of 34% by weight; ethoxylated monoglyceride (available from BASF, Florham Park, N.J.) in an amount of 10% by weight; and sodium stearoyl lactylate in an amount of 10% by weight.

The components were mixed and homogenized under high shear mixing for between 30 minutes to 60 minutes at ambient temperature. The microemulsion was poured into a 250 ml graduated cylinder and observed for any separation. The emulsion was stable over one month at room temperature. The particle size distribution and photo micrographs showed a tight distribution of particle size.

EXAMPLE 6

This embodiment describes a method of preparing a bioremediation composition using soy soap stock.

A microemulsion composition was prepared by mixing: neutralized acid oil (available from Archer-Daniels-Midland Company, Decatur Ill.) in an amount of 42% by weight; crude glycerol (available from Archer-Daniels-Midland Company, Decatur Ill.) in an amount of 20% of total neutralized acid oil weight; ethyl lactate (available from Archer-Daniels-Midland Company, Decatur Ill.) in an amount of 38% by weight; ethoxylated monoglyceride (available from BASF, Florham Park, N.J.) in an amount of 15% by weight; and lecithin (Thermolec WFC, a chemically modified lecithin available from Archer-Daniels-Midland Company, Decatur Ill.) in an amount of 5% by weight.

The acid oil was neutralized by adding sodium hydroxide, thus bringing the pH (originally 10.0) close to that of the normal soap stock obtained after crude oil processing.

The components were mixed and homogenized under high shear mixing for between 30 minutes to 60 minutes at ambient temperature. The microemulsion was poured into a 250 ml graduated cylinder and observed for any separation. The microemulsion was stable over one month at room temperature. The particle size distribution and photo micrographs showed a tight distribution of particle size.

EXAMPLE 7

This embodiment describes a method of preparing a bioremediation composition using soy soap stock.

A microemulsion composition was prepared by mixing: neutralized acid oil (available from Archer-Daniels-Midland Company, Decatur Ill.) in an amount of 32% by weight; crude glycerol (available from Archer-Daniels-Midland Company, Decatur Ill.) in an amount of 20% of total neutralized acid oil weight; ethyl lactate (available from Archer-Daniels-Midland Company, Decatur Ill.) in an amount of 44% by weight; polylactate produced as described in Example 3, in amount of 4% by weight; ethoxylated monoglyceride (available from BASF, Florham Park, N.J.) in an amount of 15% by weight; and lecithin (Thermolec WFC, a chemically modified lecithin available from Archer-Daniels-Midland Company, Decatur Ill.) in an amount of 5% by weight.

The components were mixed and homogenized under high shear mixing for between 30 minutes to 60 minutes at ambient temperature. The microemulsion was poured into a 250 ml graduated cylinder and observed for any separation. The microemulsion was stable over one month at room temperature. The particle size distribution and photo micrographs showed a tight distribution of particle size.

EXAMPLE 8

This embodiment describes a method of preparing a bioremediation composition using soy soap stock.

A microemulsion composition was prepared by mixing: neutralized acid oil (available from Archer-Daniels-Midland Company, Decatur Ill.) in an amount of 42% by weight; crude glycerol (available from Archer-Daniels-Midland Company, Decatur Ill.) in an amount of 20% of total neutralized acid oil weight; ethyl lactate (available from Archer-Daniels-Midland Company, Decatur Ill.) in an amount of 38% by weight; ethoxylated monoglyceride in an amount of 15% by weight; and lecithin (Thermolec WFC, a chemically modified lecithin available from Archer-Daniels-Midland Company, Decatur Ill.) in an amount of 5% by weight.

The acid oil was neutralized by adding sodium hydroxide bringing the pH (originally 10.0) close to that of the normal soap stock obtained after crude oil processing.

The components were mixed and homogenized under high shear mixing for between 30 minutes to 60 minutes. The microemulsion was poured into a 250 ml graduated cylinder and observed for any separation. The microemulsion was stable over one month time at room temperature. The particle size distribution and photo micrographs showed tight distribution of particle size.

EXAMPLE 9

A microemulsion composition was prepared by mixing: soy soapstock (available from Archer-Daniels-Midland Company, Decatur Ill.) in an amount of 60% by weight; ethyl lactate (available from Archer-Daniels-Midland Company, Decatur Ill.) in an amount of 20% by weight; ethoxylated monoglyceride (available from BASF, Florham Park, N.J.) in an amount of 15% by weight; lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsions were very stable over one month at room temperature. The particle size distribution and photo micrographs showed a tight distribution of particle size.

EXAMPLE 10

A microemulsion composition was prepared by mixing: soy soapstock (available from Archer-Daniels-Midland Company, Decatur Ill.) in an amount of 70% by weight; ethyl lactate (available from Archer-Daniels-Midland Company, Decatur Ill.) in an amount of 10% by weight; ethoxylated monoglyceride (available from BASF, Florham Park, N.J.) in an amount of 15% by weight; lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsions were very stable over one month at room temperature. The particle size distribution and photo micrographs showed a tight distribution of particle size.

EXAMPLE 11

A microemulsion composition was prepared by mixing: soy soapstock (available from Archer-Daniels-Midland Company, Decatur Ill.) in an amount of 50% by weight; crude filtered soybean oil (available from Archer-Daniels-Midland Company, Decatur Ill.) in an amount of 10% by weight; ethyl lactate (available from Archer-Daniels-Midland Company, Decatur Ill.) in an amount of 20% by weight; ethoxylated monoglyceride (available from BASF, Florham Park, N.J.) in an amount of 15% by weight; lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsions were very stable over one month at room temperature. The particle size distribution and photo micrographs showed a tight distribution of particle size.

EXAMPLE 12

A microemulsion composition was prepared by mixing: soy soapstock (available from Archer-Daniels-Midland Company, Decatur Ill.) in an amount of 34% by weight; Performix E; a blend of fluid lecithin with small amounts of propylene glycol, soybean oil and ethoxylated monoglycerides (available from Archer-Daniels-Midland Company, Decatur Ill.) in an amount of 4% by weight; ethyl lactate (available from Archer-Daniels-Midland Company, Decatur Ill.) in an amount of 45% by weight; ethoxylated monoglyceride (available from BASF, Florham Park, N.J.) in an amount of 12% by weight; lecithin (Thermolec WFC, a chemically modified lecithin available from Archer-Daniels-Midland Company, Decatur Ill.) in an amount of 5% by weight.

The components were mixed and homogenized under high shear mixing for between 30 minutes and 60 minutes at ambient temperature. The microemulsion was poured into a 250 ml graduated cylinder and observed for any separation. The microemulsions were very stable over one month at room temperature. The particle size distribution and photo micrographs showed a tight distribution of particle size.

EXAMPLE 13

An emulsion concentrate was prepared by mixing soy soapstock in an amount of 38% by weight (which optionally can include crude glycerol where 20% of total soapstock by weight would be used), ethyl lactate in an amount of 45% by weight, ethoxylated monoglycerides in an amount of 12% by weight, and lecithin (Thermolec WFC, a chemically modified lecithin available from Archer-Daniels-Midland Company, Decatur Ill.) in an amount of 5% by weight.

The ingredients were mixed and homogenized under high shear mixing for between 30 minutes to 60 minutes. The microemulsion was poured into 250 ml graduated cylinder to observe for any separation. All microemulsions made were very stable over a month's time at room temperature. The particle size distribution and photo micrographs showed very tight distribution of particle size.

EXAMPLE 14

Figure 4:
FIG. 4 depicts various embodiments of microemulsions of the present invention in water with increments of 5% microemulsion going to the right.

To show that the microemulsion of Example 13 is a complete delivery system, the dilution point where the microemulsion goes from a one phase system to a stable milky emulsion was determined. 5 g increments of the microemulsion were added starting at a ratio of 95:5 (microemulsion:water). The microemulsion solubilized all the water and formed swollen micelles beyond which the system turned into a milky emulsion up until the dilution of 45% water as shown in FIG. 4.

Starting at the 55:45 microemulsion:water dilution, an iron gluconate solution (2% w/v) was added and a cystein solution (at 2% w/v) was added to evaluate whether the iron gluconate and the cystein is completely solubilized in the microemulsion with no phase separation. The iron gluconate and cystein were added individually and as a mixture at 3:1 ratio as shown in Table 1. As shown in Table 1, a clear phase formed with the iron gluconate, cystein and combination thereof using the microemulsion.

TABLE 1

| (%) Microemulsion of Example 13 | (%) Iron Gluconate (2% w/v) | (%) Cystein (2% w/v) | (%) Water | Phase |
|---|---|---|---|---|
| 50 | 0 | 0 | 50 | Emulsion |
| 55 | 0 | 0 | 45 | Clear |
| 55 | 45 | 0 | 0 | Clear |
| 55 | 0 | 45 | 0 | Clear |
| 55 | 34 | 11 | 0 | Clear |
| 60 | 0 | 0 | 40 | Clear |
| 60 | 40 | 0 | 0 | Clear |
| 60 | 0 | 40 | 0 | Clear |
| 60 | 30 | 10 | 0 | Clear |
| 65 | 0 | 0 | 35 | Clear |

Thus, the microemulsion can be used to solubilize water soluble or water insoluble materials for subsequent use in any remediation, agricultural or industrial application.

EXAMPLE 15

Magnetite was prepared by the coprecipitation of Fe(II) and Fe(III). The precipitated magnetite was black in color. The chemical reaction for the production of magnetite ($Fe_3O_4$) is as follows: $Fe^{2+}+2Fe^{3+} \rightarrow Fe_3O_4+4H_2O$.

A complete precipitation of $Fe_3O_4$ is expected between pH 9 to 14 while maintaining a molar ratio of $Fe^{3+}/Fe^{2+}$ of 2:1 under inert conditions to prevent $Fe_3O_4$ from being oxidized to $Fe(OH)_3$ per the following: $Fe_3O_4+0.25\ O^2+4.5\ H_2O \rightarrow 3\ Fe(OH)_3$.

A given volume of solution of Fe(II) and Fe(III) chloride (molar ration of 1:2) in deoxygenated Milli-Q water at a total concentration of 1.2 M was poured slowly (dropwise) at a slow rate into a three-neck flasks reaction vessel containing 0.9M $NH_4OH$ solution. The $NH_4OH$ solution was kept under argon atmosphere at room temperature and vigorously stirred. After addition of the iron salts, the mixture was stirred for another 20 minutes and the precipitated magnetite was separated from the supernatant by decantation under an inert atmosphere. The solid was washed 4 times with deoxygenated Milli-Q water and separated by decantation. The suspension was centrifuged at 3500 rpm and the remaining solid was dried in a vacuum desiccator. The method rapidly settled the precipitates at the bottom of the reaction vessel and indicated a higher particle size.

EXAMPLE 16

Magnetite nanoparticles, which may also be referred to as magnetite microemulsions, were synthesized using the microemulsion concentrate of Example 13, magnetite, and the procedure outlined in Example 14. The microemulsion concentrate was prepared by mixing soy soapstock in an amount of 38% by weight (which optionally can include crude glycerol where 20% of total soapstock by weight would be used), ethyl lactate in an amount of 45% by weight, ethoxylated monoglycerides in an amount of 12% by weight, and lecithin (Thermolec WFC, a chemically modified lecithin available from Archer-Daniels-Midland Company, Decatur Ill.) in an amount of 5% by weight.

The nanoparticles were prepared in situ by mixing 60 g of the microemulsion concentrate with 20 g of 0.5 M $FeCl_3$ solution and 20 g of 0.25 M $FeCl_2$ in order to form reverse micelles. As the microemulsion concentrate is water dilutable up to 50%, ratios of microemulsion/aqueous solution ratios of 90/10, 80/20, 70/30, and 60/40 were used, where the aqueous solution included all the reactants for the magnetite synthesis. A 30% solution of $NH_4OH$ was used as a neutralizing agent.

The nanoparticle (or microemulsion) synthesis included dropwise addition of the $NH_4OH$ solution into the microemulsion/aqueous solution (including the reactants for the magnetite synthesis) until a pH of 9-10 was achieved. In another embodiment, the $NH_4OH$ solution could be added to the microemulsion before the microemulsion is mixed with the aqueous solution including the reactants for the magnetite synthesis.

The formation of the magnetite particles was observed by the color change of the microemulsion/aqueous solution neutralized by the $NH_4OH$ solution to black. After the solution turned black, acetone was used to separate the magnetic particles washed in water and centrifuged to compare the particle size. The magnetite is formed in the microemulsion phase, in situ. This Example was done in an inert environment to prevent the iron hydroxide from precipitating from contact with oxygen.

EXAMPLE 17

Green Rust was prepared by the coprecipitation of Fe(II) and Fe(III). The precipitated material was greenish black in color. The Green Rust was prepared by mixing given volumes of aqueous solutions of Fe(II) and Fe(III) and a base, such as ammonium hydroxide or sodium hydroxide, at a ratio of $\{[FeCl_2]+[FeCl_3]\}/[NH_4OH]$ of 0.6 and a $[FeCl_2]/[FeCl_3]$ such as Fe(II)/Fe(III) ratio is 3. The resulting precipitate is kept free of oxygen to eliminate any secondary oxidation to the corresponding hydroxides.

A given volume of a solution of Fe(III) and Fe(II) chloride (molar ration of 1:3) in deoxygenated Milli-Q water at a total concentration of 1.0 M was slowly poured (dropwise) at a slow rate into a three-neck flask reaction vessel containing 0.9 M $NH_4OH$ solution. The solution was kept under an inert atmosphere at room temperature and vigorously stirred. After the iron salts were added, the mixture was stirred for 20 minutes and the precipitated Green Rust was separated from the supernatant by decantation under inert atmosphere. The precipitated Green Rust was washed 4 times with deoxygenated Milli-Q water and separated by decantation. The suspension was centrifuged at 3500 rpm and the remaining solid was dried in a vacuum dessicator. The method rapidly settled the precipitates at the bottom of the reaction vessel which indicated a higher particle size.

EXAMPLE 18

Green rust nanoparticles were synthesized using the microemulsion concentrate of Example 13, Green Rust, and the procedure outlined in Example 14. The microemulsion concentrate was prepared by mixing soy soapstock in an amount of 38% by weight (which optionally can include crude glycerol where 20% of total soapstock by weight would be used), ethyl lactate in an amount of 45% by weight, ethoxylated monoglycerides in an amount of 12% by weight, and lecithin (Thermolec WFC, a chemically modified lecithin available from Archer-Daniels-Midland Company, Decatur Ill.) in an amount of 5% by weight.

The nanoparticles were prepared in situ by mixing 60 g of the microemulsion concentrate with 20 g of 0.25 M $FeCl_3$ solution and 20 g of 0.25 M $FeCl_2$ in order to form reverse micelles. A 30% solution of $NH_4OH$ was used as a neutralizing agent. The nanoparticle synthesis included dropwise addition of the $NH_4OH$ solution into the microemulsion/aqueous solution (including the reactants for the green rust synthesis) until a pH of 9-10 was achieved, at which point the solution was constantly stirred for 60 minutes. The formation of the green particles was observed by a color change of the solution to greenish black. After the solution turned greenish black, acetone was used to separate the green rust particles washed in water and centrifuged to compare the particle size. The green rust is formed in the microemulsion phase, in situ. This Example was done in an inert environment to prevent the iron hydroxide from precipitating from contact with oxygen.

EXAMPLE 19

Nanoscale iron sulfide particles are a reactive medium that displays a higher reactivity that other iron in the reductive dechlorination of chlorinated hydrocarbons. Iron sulfides are recognized as a valuable inorganic material due to its superior reducing capability and can be used in environmental remediation. Iron sulfides also have a high affinity for heavy metals and chlorinated pollutants.

Iron sulfide was synthesized by making a 1.0 M sodium dithionate solution in 0.5 M $NaBH_4$. The presence of sodium borohydrite causes a lot of bubbles unless its made in an alkaline medium (pH about 8) such as in ammonium hydroxide. The resulting sodium dithionate solution was dropwise added to about 0.5 M Ferric Chloride solution at a volume ratio of about 3:1 at which point the solution turned black indicative of the formation of iron sulfide, FeS. The reaction was carried out at ambient temperature, the solution was degassed, and the precipitates were washed. Such method rapidly settled the precipitates at the bottom of the reaction vessel indicating a larger particle size.

EXAMPLE 20

Iron sulfide nanoparticles were synthesized using the microemulsion concentrate of Example 13, iron sulfide, and the procedure outlined in Example 14. The microemulsion concentrate was prepared by mixing soy soapstock in an amount of 38% by weight (which optionally can include crude glycerol where 20% of total soapstock by weight would be used), ethyl lactate in an amount of 45% by weight, ethoxylated monoglycerides in an amount of 12% by weight, and lecithin (Thermolec WFC, a chemically modified lecithin available from Archer-Daniels-Midland Company, Decatur Ill.) in an amount of 5% by weight.

The nanoparticles were prepared in situ by mixing 60 g of the microemulsion concentrate with 20 g of 0.5 M $FeCl_3$ solution in order to form reverse micelles. A 1.0 M sodium dithionate solution was made with 0.5 M $NaBH_4$. The sodium dithionate solution was dropwise added to the microemulsion/$FeCl_3$ solution at a 3:1 volume ratio. The formation of the FeS particles was observed by a color change of the solution to black. After the solution turned black, acetone was used to separate the green rust particles washed in water and centrifuged to compare the particle size.

EXAMPLE 21

Iron nanoparticles were formed according to the following reaction: $Fe^{2+}+2BH_4^-+6H_2O \rightarrow Fe+2B(OH)_3+7H_2\uparrow$. The synthesis was carried out by preparing a 1M $NaBH_4$ solution in alkaline medium. The presence of the sodium borohydrite causes a lot of bubbles so the solution is made in alkaline medium, such as ammonium hydroxide with a pH of about 8. The resulting solution was dropwise added to a 0.6 M ferric chloride solution which resulted in the solution turning black, indicative of the formation of zero valent iron. The reaction was done at ambient temperature, the solution was degassed, and the precipitates were washed. This method rapidly settled the precipitates at the bottom of the reaction vessel to indicate a larger particle size.

EXAMPLE 22

Zero valent iron nanoparticles were synthesized using the microemulsion concentrate of Example 13, zero valent iron, and the procedure outlined in Example 14. The microemulsion concentrate was prepared by mixing soy soapstock in an amount of 38% by weight (which optionally can include crude glycerol where 20% of total soapstock by weight would be used), ethyl lactate in an amount of 45% by weight, ethoxylated monoglycerides in an amount of 12% by weight, and lecithin (Thermolec WFC, a chemically modified lecithin available from Archer-Daniels-Midland Company, Decatur Ill.) in an amount of 5% by weight.

The nanoparticles were prepared in situ by mixing 60 g of the microemulsion concentrate with 20 g of 0.6 M $FeCl_3$ solution in order to form reverse micelles. A 1.0 M $NaBH_4$ solution was dropwise added to the microemulsion/$FeCl_3$ solution and mixed at constant stirring for about 30 minutes. The formation of the zero valent iron particles was observed by a color change of the solution to black. After the solution turned black, acetone was used to separate the zero valent iron particles washed in water and centrifuged to compare the particle size.

EXAMPLE 23

Figure 5:
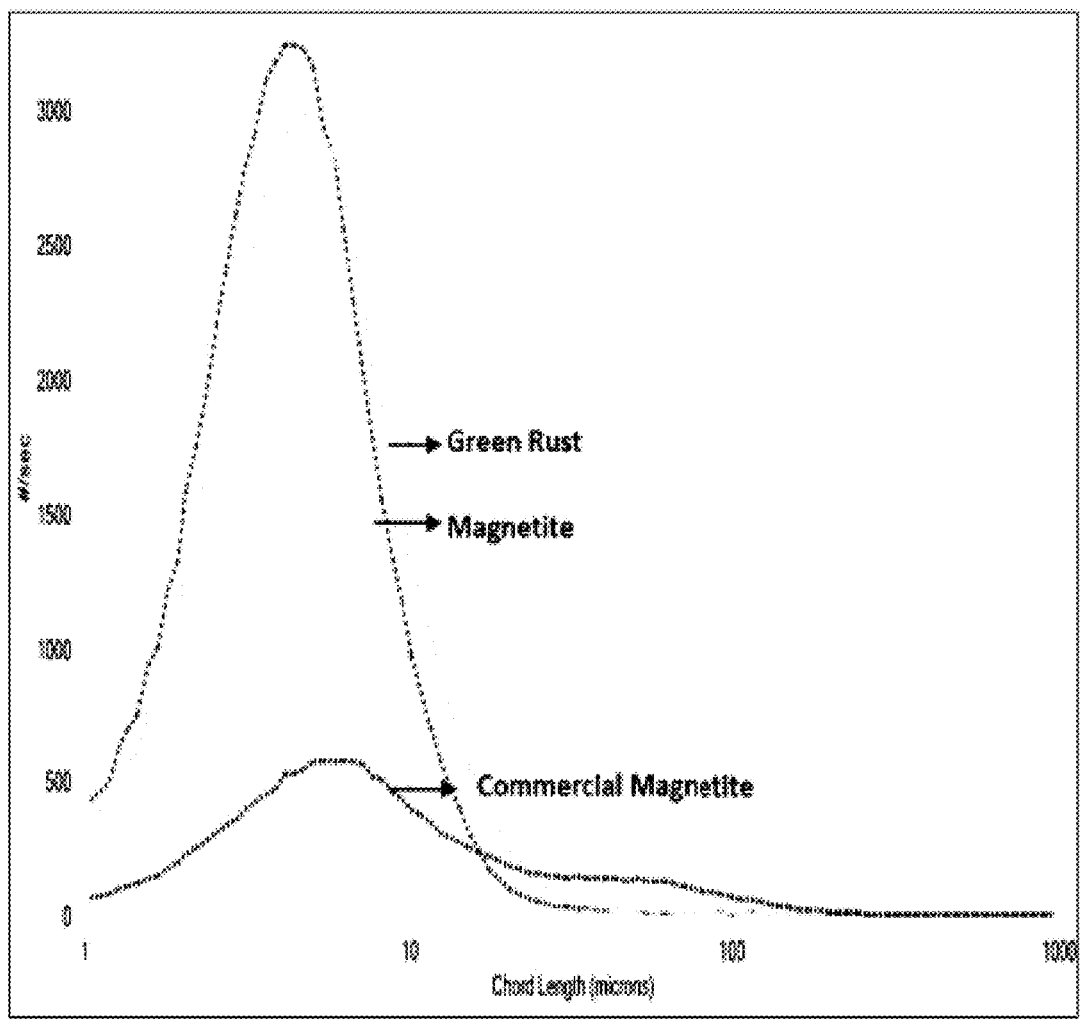
FIG. 5 shows the particle sizes of various embodiments of microemulsions combined with reductants of the present invention.

The particle sizes of the magnetite nanoparticles of Example 16 and the green rust nanoparticles of Example 18 were analyzed using Focused Beam Reflectance Measurement (FBRM®) from Mettler Toledo. Such analysis provides the ability to measure particles and droplets in concentrated suspensions and emulsions. The particles sizes are shown in FIG. 5. The particle sizes of FIG. 5 indicates a good distribution of particle size for the magnetite and green rust made in the microemulsion system.

EXAMPLE 24

Figure 6:
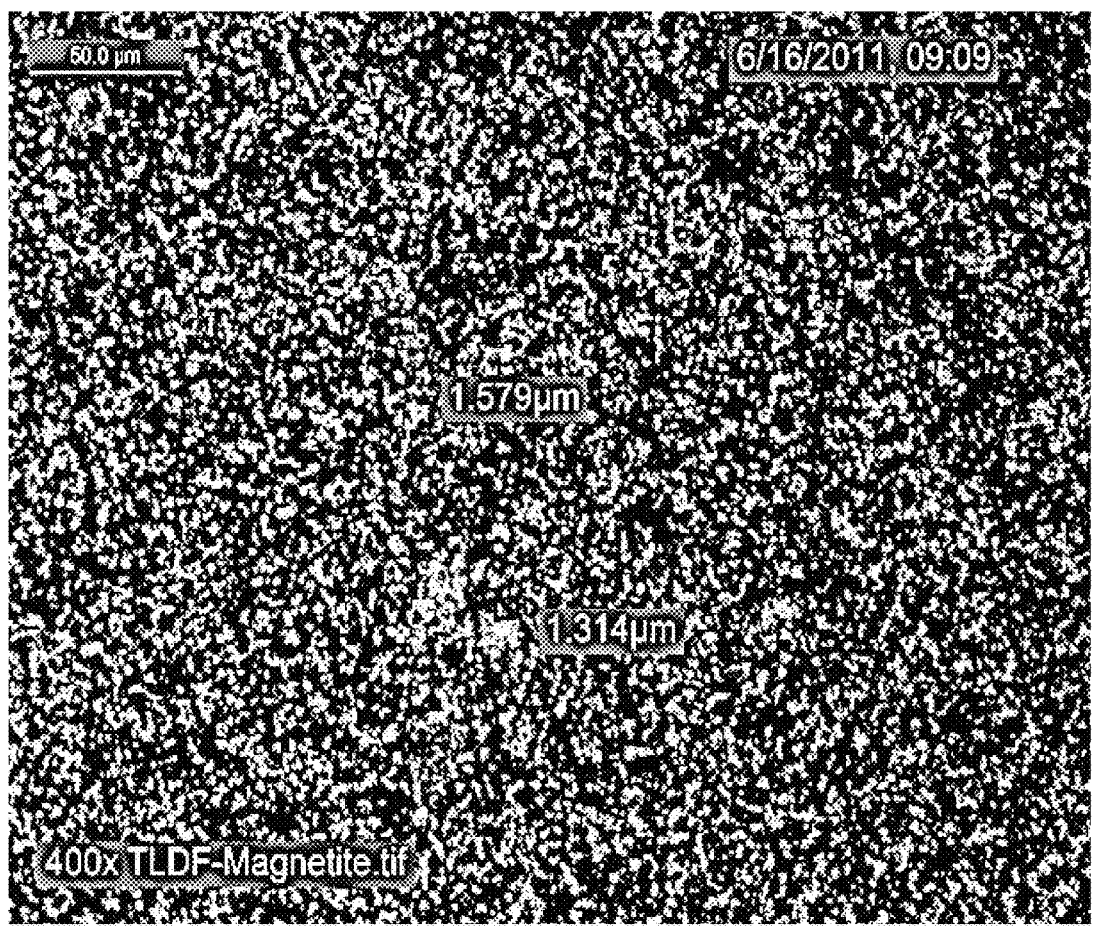
FIG. 6 shows the particle sizes of one embodiment of a microemulsion and reductant of the present invention.

The particles of the dry magnetite of Example 16 after separation from the microemulsion using acetone followed by repeated washing in water, centrifugation, and drying under vacuum were observed with polarized light microscopy (PLM). As shown in FIG. 6, most of the particles were between 1-1.5 microns.

EXAMPLE 25

The following bioremediation microcosms were performed in a laboratory setting. Such microcosms may be scaled up and the principles of operation and amounts of the various components used in such microcosms may be adjusted for the scaling up of such microcosms for use in large-scale bioremediation systems. Each formulation was run in triplicate and each bottle was sample for PCE and daughter products at several different times during the PCE degradation. The number of points and times of the sampling were selected to be able to monitor the reduction in PCE and the subsequent increase and further degradation of the daughter products.

The microcosm was set up to evaluate the performance of in situ chemical reductants (ISCR, magnetite and green rust), in situ bioremediation (ISB, the emulsion concentrate), and the combination of the in situ chemical reductants with the in situ bioremediation. The studies were conducted with the following set-up: 160 ml stoppered serum bottles, in triplicate; 100 ml of groundwater; 19.54 μm PCE; 1,000 mg/L electron donor; 40 mg/L ISCR particles, the emulsion concentrate of Example 13, the magnetite nanoparticles of Example 16 and the green rust nanoparticles of Example 18; and 3 ml inoculum containing dechlorinating bacteria known to convert PCT to ethane.

The observations through day 71 indicated that there was significant activity in the inoculated microorganisms, but the activity appeared to slow after day 71. The slowdown was thought to be pH related so after day 105, the caps were unstoppered in a nitrogen headspace box and the pH was measured. Buffer was added to increase the pH. The mass loss between day 105 and 150 can be attributed to the headspace loss of daughter products during pH adjustment. After the pH adjustment on day 105, continued degradation of the PCE into ethane daughter products was observed as well as some mass loss (conversion of ethane/acetylene).

Figure 7:
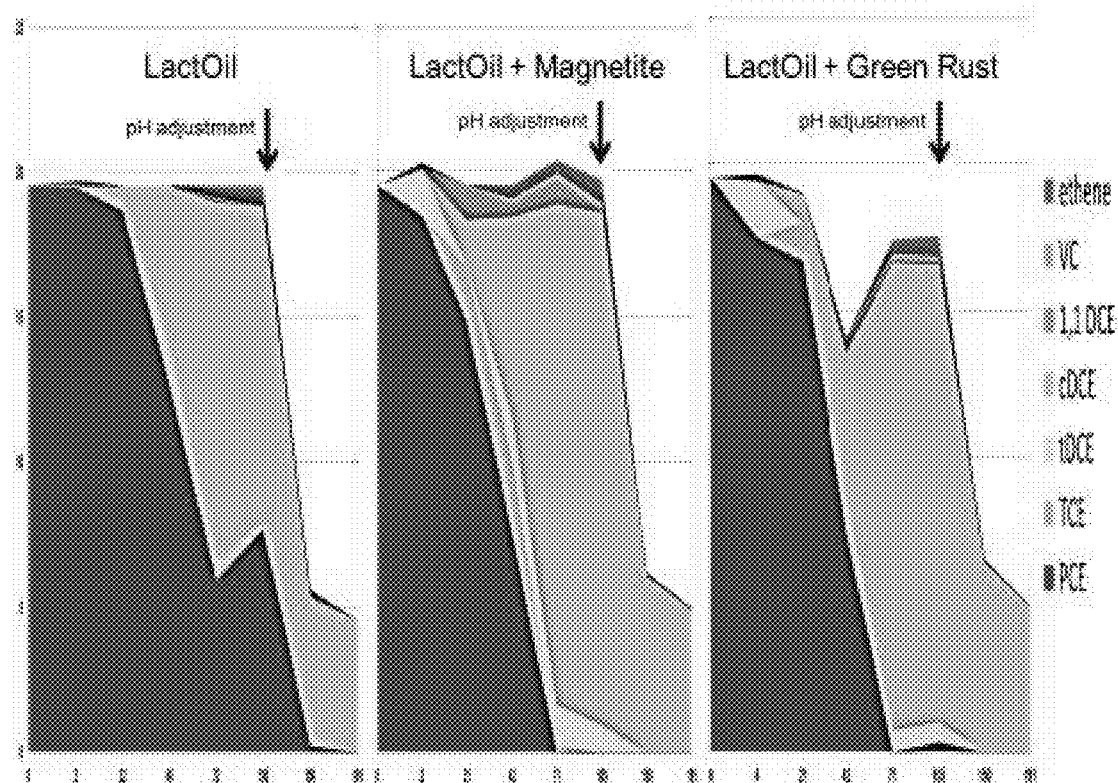
FIG. 7 shows the ability of various embodiments of microemulsions combined with reductants of the present invention to convert a contaminant to a non-innocuous derivative thereof.

As shown in FIG. 7, the inoculated microcosms shows the PCE and TCE disappearing more rapidly with the magnetite nanoparticles (second graph) and the green rust nanoparticles (third graph) as compared to the emulsion concentrate by itself (first graph). This indicates that the combination of the in situ chemical reductant with the in situ bioremediation worked better than the in situ bioremediation alone. Further, the magnetite nanoparticles and the green rust nanoparticles contained the PCT daughter products trans-DCE and 1,1-DCE, while the emulsion concentrate by itself did not have any trans-DCE and very small amounts of 1,1-DCE. These daughter products of PCE are not typical of purely biotic systems.

Figure 8:
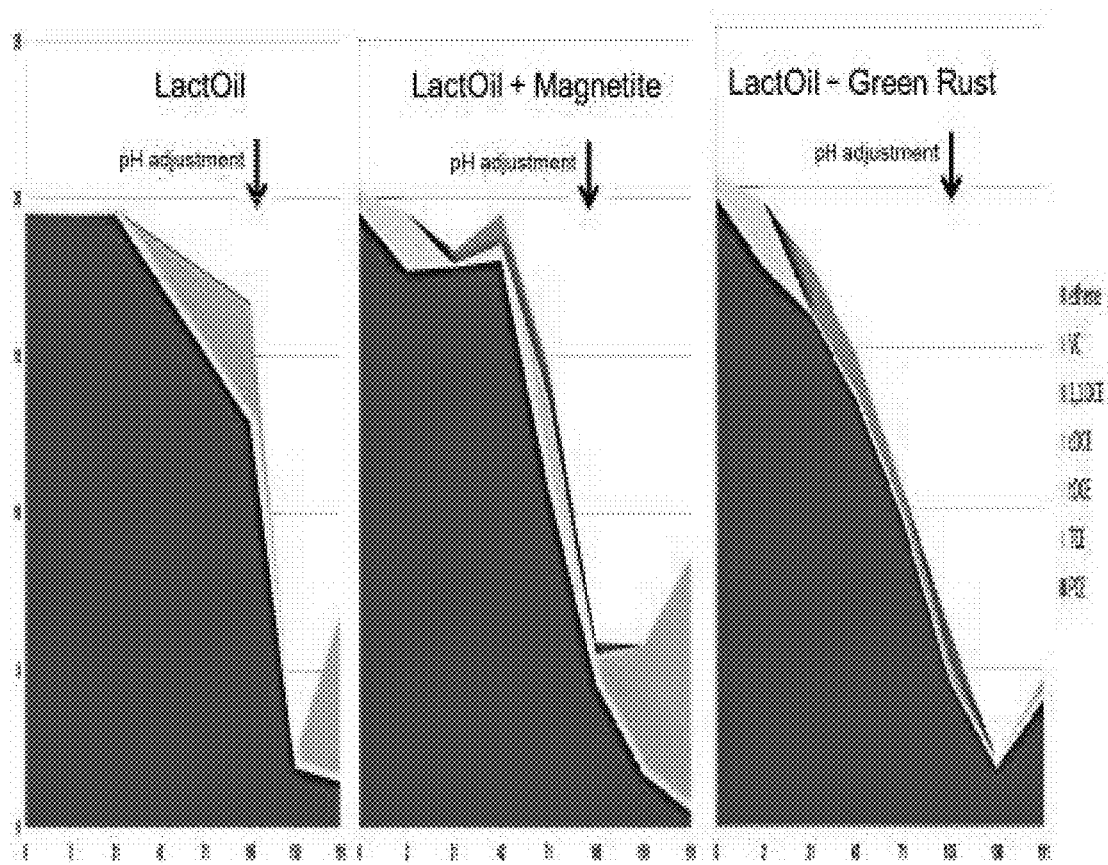
FIG. 8 shows the ability of various embodiments of microemulsions combined with reductants of the present invention to convert a contaminant to a non-innocuous derivative thereof.

FIG. 8 shows the uninoculated microcosms containing the emulsion concentrate by itself (first graph), the magnetite nanoparticles (second graph), and the green rust nanoparticles (third graph). For the first 21 days, the emulsion concentrate showed little biological activity. However, since the microcosms are not sterilized, microorganisms present in microcosm started showing significant bioremediation activity starting with day 42. The primary daughter products with the emulsion concentrate sample was TCE and cis-DCE, which are typically present with biological remediation. Similar to the inoculated microcosms, the uninoculated magnetite nanoparticles and the green rust nanoparticles each generated significant levels of trans-DCE, some 1,1-DCE, and no TCE during the first 21 days when biological activity was negligible. In addition, the green rust nanoparticles show showed very little TCE and cis-DCE generation despite the biological activity from the microorganisms present in the microcosm system. These patterns are characteristic of abiotic degradation pathways. When comparing the inoculated magnetite nanoparticles and the uninoculated magnetite nanoparticles and the inoculated green rust nanoparticles and the uninoculated green rust nanoparticles, the combined biotic and abiotic processes degraded PCE more quickly than the abiotic process alone.

The data for the inoculated microcosms of FIG. 7 are shown in FIG. 9. The data for the uninoculated microcosms of FIG. 8 are shown in FIG. 10.

EXAMPLE 26

Silver nanoparticles are produced at low temperatures which is cost efficient without causing any change in the physical, optical, and catalytic properties. Low temperate procedures make silver nanoparticles ideal for printing electronics on paper and plastics, materials that can easily be destroyed when exposed to high temperatures. Making such nanoparticles at low temperatures is highly beneficial and the microemulsions described herein are a good medium or carrier vehicle for such materials.

For the synthesis of such nanoparticles in situ in the water-in-oil microemulsion phase, a 0.05 M aqueous $AgNO_3$ solution and a 0.1M aqueous $NaBH_4$ solution are separately used instead of water to form reverse micelles. The $NaBH_4$ acts as a reducing agent. The synthesis involves mixing 0.5 ml of 0.05 M aqueous $AgNO_3$ solution in the microemulsion described herein and 0.5 ml of 0.1M aqueous $NaBH_4$ solution in the microemulsion. The two samples are mixed at constant stirring for 60 minutes. The formation of the silver particles is observed by a color change of the solution. Once this takes place, unlike the traditional way of separating nanoparticles in an emulsion using solvents, just the act of adding water leads to larger micelles and is seen as a milky emulsion. This can be centrifuged to obtain the silver nanoparticles that can be suspended in any solvent such as ethyl lactate by sonification.

Since such microemulsions are typically formed with a high amount of surfactant and oil (w/o) system using environmentally unfriendly or toxic compounds, this Example uses benign and/or green surfactants or solvents is helpful for nanoparticle synthesis. Using a green surfactant and no-VOC solvent to form a microemulsion to make nanoparticles shows promise for a number of applications.

EXAMPLE 27

Micellar Enhanced Ultrafiltration (MEUF) has been shown to be a promising method for the removal of low-levels of toxic heavy metal ions and organic compounds from industrial effluents. The basic idea is that the surfactant forms large amphiphilic aggregate micelles when the surfactant is added to aqueous streams at a concentration higher than the surfactant's critical micelle concentration (CMC).

Contaminants such as metal ions and/or dissolved organic compounds can be trapped by the micelles if such metal ions or dissolved organic compounds tend to be attracted by the micelle surface and become solubilized in the micelle interior, respectively. The metal ions and/or dissolved organic compounds may be retained after being trapped within the micelles, whereas the untrapped metal ions and/or dissolved organic compounds pass through an ultra-filtration membrane. The advantages of such method are the low-energy requirements involved in the ultra-filtration processes and the ultra-filtration process's high removal efficiency owing to the effective trapping of the metal ions and/or dissolved organic compounds by the micelles.

Fundamental to this process is the existence of surfactant aggregates (micelles) that form spontaneously when surfactants are added to water. If the contaminants in the water attach to such micelles, the contaminants can be removed together with the micelles by ultra-filtration, using a membrane with pores smaller than the micelles. Systems that are water in oil microemulsions, like the microemulsions described herein, are beneficial when the solubilizing capacity is high, but yet at the same time by simple dilution can be used to break the emulsion and recover the contaminant from the system.

An ultrafiltration experiment is carried out in a batch stirred cell (Amicon, model 8050) with a capacity of 50 ml and an effective membrane area of 13.4 cm$^2$. Ultrafiltration is performed as follows: 20 ml of solution containing a contaminant, such as a metal, a ligand, and an microemulsion is passed through the ultrafiltration cell under a 2 bar nitrogen pressure. The metal-ligand complex adsorbed on the micelles is retained in the retentate (2.5 ml), while the aqueous phase containing uncomplexed ions is passed through the membrane in the permeate (17.5 ml). The retentate is mixed with the stripping solution (12.5 ml) and a second ultrafiltration is performed in order to recover the displaced metal ion, i.e., the contaminant, in the collected permeate (12.5 ml). All reactions involved are effectively instantaneous, so the procedure may be carried out immediately. Shortly after the conclusion of the procedure, the ultrafiltration membranes are flushed with deionized water and, if necessary, are regenerated according to the method recommended by Millipore (Amicon). The amounts of metal ions, i.e., the contaminant, extracted or recovered by ultrafiltration are assessed through atomic absorption spectroscopy.

EXAMPLE 28

A series of tests are conducted to evaluate the ability of an in-situ chemical reductant to be incorporated into a microemulsion prepared from any of Examples 1-13. Several in-situ chemical reductants are dispersed in the microemulsion to form a lower viscosity, single phase liquid that retains the properties of the microemulsion. Such dispersed in-situ chemical reductants are placed in a microcosm study to evaluate the ability of the dispersed in-site chemical reductants to covert a contaminant into an innocuous derivative thereof.

A system for remediating contaminated groundwater microcosms is constructed using the following components: 160 milliliter (ml) serum bottles; 100 ml of groundwater; nominally, 1 gram of limestone; 19.54 micromoles (µmoles) perchloroethene (PCE); and an excess of various electron donors are used. The in-situ chemical reductants that are used as the electron donors to be tested in triplicate are: iron sulfide, alone and dispersed with a microemulsion as described herein; iron sulfate, alone and dispersed with a microemulsion as described herein; iron chloride, alone and dispersed with a microemulsion as described herein; fougerite, alone and dispersed with a microemulsion as described herein; iron gluconate, alone and dispersed with a microemulsion as described herein; and iron lactate, alone and dispersed with a microemulsion as described herein.

EXAMPLE 29

Application in contaminated ground water site.

At a chlorinated hydrocarbon contaminated ground water site, a blended emulsion comprising a composition described herein is used. The in-situ chemical reductant dispersed in the microemulsion is delivered as a concentrate in 55-gallon drums, is diluted 4 to 1 (water to emulsion), and is injected through 1-inch direct push wells using a manifold system. To achieve the proper blend of the microemulsion and water, a pre-manufactured microemulsion concentrate may be used. Automatic dosing systems use water pressure from the water source to mix with the microemulsion and dilution water. The desired final concentration of dilute microemulsion (e.g., 1:4 to 1:20 dilutions) is adjusted by dialing in the amount of water and microemulsion. These systems may install directly to any available water supply line and operate without electricity, using water pressure as the power source. The microemulsion concentrate is pulled directly from the supply drum, tote, or tank and is mixed with water at the set dilution rate. The water pressure forces the diluted microemulsion downstream to the injection well. The amount of microemulsion concentrate is directly proportional to the volume of water entering the system, so variations in water pressure or flow rate have no effect on the dilution. Depending on the injection well layout and formation permeability, microemulsion injection can require a few hours to several days per well.

This disclosure has been described with reference to certain exemplary embodiments, compositions and uses thereof. However, it will be recognized by those of ordinary skill in the art that various substitutions, modifications or combinations of any of the exemplary embodiments may be made without departing from the spirit and scope of the disclosure. Thus, the disclosure is not limited by the description of the exemplary embodiments, but rather by the appended claims as originally filed.

What is claimed is:
1. A composition comprising:
   a reductant; and
   a microemulsion comprising lecithin;
   wherein the reductant is incorporated in the microemulsion; and
   wherein the reductant is selected from the group consisting of ferrous oxide, hematite, maghemite, ferrous hydroxide, ferric hydroxide, goethite, akaganeite, lepidocrocite, ferroxyhyte, ferrihydrite, schwertmannite, green rust, fougerite, troilite, greigite, pyrrhotite, mackinawite, siderite, vivianite, and combinations of any thereof;
   wherein the composition is aqueous.
2. The composition of claim 1, wherein the microemulsion comprises water, oil, a surfactant, and a co-surfactant.
3. The composition of claim 1, wherein the reductant is an in-situ chemical reductant.
4. The composition of claim 1, wherein the microemulsion further comprises a compound selected from the group consisting of triglycerides, diglycerides, monoglycerides, sugar alcohols, fatty acid ethoxylates, sorbitan monoester, polyoxyethylene alkyl ethers, polyoxyethylene alkyl esters, sorbitan alkyl esters, polyoxyethylene sorbitan alkyl esters, glycerol esters, short chain fatty alcohols, acids, esters, glycerols, glycols, and combinations of any thereof.
5. The composition of claim 1, further comprising a buffer.
6. The composition of claim 1, wherein the microemulsion further comprises a low molecular weight water soluble polymer or a biopolymer.
7. The composition of claim 1, wherein the microemulsion further comprises a polyhydric alcohol selected from the group consisting of glycerol, ethylene glycol, propylene glycol, sugar alcohols, and combinations of any thereof.
8. The composition of claim 1, wherein the reductant is located in a micelle formed by the microemulsion.
9. A composition comprising:
   a reductant; and
   a microemulsion comprising lecithin;
   wherein the reductant is selected from the group consisting of ferrous oxide, hematite, maghemite, ferrous hydroxide, ferric hydroxide, goethite, akaganeite, lepidocrocite, ferroxyhyte, ferrihydrite, schwertmannite, green rust, fougerite, troilite, greigite, pyrrhotite, mackinawite, siderite, vivianite, and any combinations thereof;

wherein the microemulsion comprises a compound selected from the group consisting of triglycerides, diglycerides, monoglycerides, sugar alcohols, fatty acid ethoxylates, sorbitan monoester, polyoxyethylene alkyl esters, sorbitan alkyl esters, polyoxyethylene sorbitan alkyl esters, glycerol esters, short chain fatty alcohols, acids, esters, glycerols, glycols, and combinations of any thereof; and wherein the reductant is incorporated in the microemulsion.

10. The composition of claim 9, wherein the microemulsion further comprises a compound selected from the group consisting of soy soapstock, acid oil of soy soapstock, neutralized acid oil, soybean oil, ethyl lactate, ethoxylated monoglyceride, polylactate, crude glycerol, sodium stearoyl lactylate, propylene glycol, and combinations of any thereof.

11. A composition comprising:
a reductant; and
a microemulsion comprising lecithin, water, oil, a surfactant, and a co-surfactant;
wherein the reductant is incorporated in the microemulsion; and
wherein the reductant is selected from the group consisting of ferrous oxide, hematite, maghemite, ferrous hydroxide, ferric hydroxide, goethite, akaganeite, lepidocrocite, ferroxyhyte, ferrihydrite, schwertmannite, green rust, fougerite, troilite, greigite, pyrrhotite, mackinawite, siderite, vivianite, and combinations of any thereof.

12. A composition comprising:
a reductant;
a buffer; and
a microemulsion comprising lecithin;
wherein the reductant is incorporated in the microemulsion; and
wherein the reductant is selected from the group consisting of ferrous oxide, hematite, maghemite, ferrous hydroxide, ferric hydroxide, goethite, akaganeite, lepidocrocite, ferroxyhyte, ferrihydrite, schwertmannite, green rust, fougerite, troilite, greigite, pyrrhotite, mackinawite, siderite, vivianite, and combinations of any thereof.

13. A composition comprising:
a reductant; and
a microemulsion comprising lecithin and a low molecular weight water soluble polymer or a biopolymer;
wherein the reductant is incorporated in the microemulsion; and
wherein the reductant is selected from the group consisting of ferrous oxide, hematite, maghemite, ferrous hydroxide, ferric hydroxide, goethite, akaganeite, lepidocrocite, ferroxyhyte, ferrihydrite, schwertmannite, green rust, fougerite, troilite, greigite, pyrrhotite, mackinawite, siderite, vivianite, and combinations of any thereof.

14. A composition comprising:
a reductant; and
a microemulsion comprising lecithin and a polyhydric alcohol selected from the group consisting of glycerol, ethylene glycol, propylene glycol, sugar alcohols, and combinations of any thereof;
wherein the reductant is incorporated in the microemulsion; and
wherein the reductant is selected from the group consisting of ferrous oxide, hematite, maghemite, ferrous hydroxide, ferric hydroxide, goethite, akaganeite, lepidocrocite, ferroxyhyte, ferrihydrite, schwertmannite, green rust, fougerite, troilite, greigite, pyrrhotite, mackinawite, siderite, vivianite, and combinations of any thereof.

* * * * *